United States Patent
Yu et al.

(10) Patent No.: US 8,479,309 B2
(45) Date of Patent: Jul. 2, 2013

(54) ULTRA-LOW DAMPING IMAGING MODE RELATED TO SCANNING PROBE MICROSCOPY IN LIQUID

(75) Inventors: Min-Feng Yu, Champaign, IL (US); Majid Minary-Jolandan, Chicago, IL (US)

(73) Assignee: The Board of Trustees of the University of Illinois, Urbana, IL (US)

(*) Notice: Subject to any disclaimer, the term of this patent is extended or adjusted under 35 U.S.C. 154(b) by 221 days.

(21) Appl. No.: 13/096,378

(22) Filed: Apr. 28, 2011

(65) Prior Publication Data
US 2012/0278958 A1 Nov. 1, 2012

(51) Int. Cl.
*G01Q 30/00* (2010.01)

(52) U.S. Cl.
USPC ........ 850/8; 850/21; 850/33; 850/35; 850/37; 850/12; 850/14; 850/15

(58) Field of Classification Search
USPC .................. 850/8, 12, 14, 15, 21, 33, 35, 37, 850/38
See application file for complete search history.

(56) References Cited

U.S. PATENT DOCUMENTS

| | | | |
|---|---|---|---|
| 5,386,110 A | 1/1995 | Toda | |
| 5,515,719 A | 5/1996 | Lindsay | |
| 5,578,745 A | 11/1996 | Bayer et al. | |
| 5,753,911 A | 5/1998 | Yasuda et al. | |
| 5,874,668 A | 2/1999 | Xu et al. | |
| 6,016,693 A | 1/2000 | Viani et al. | |
| 6,066,265 A | 5/2000 | Galvin et al. | |
| 6,100,524 A | 8/2000 | Yagi et al. | |
| 6,291,140 B1 | 9/2001 | Andreoli et al. | |
| 6,545,492 B1 | 4/2003 | Altmann et al. | |
| 6,583,411 B1 | 6/2003 | Altmann et al. | |
| 6,690,008 B2 | 2/2004 | Hantschel et al. | |
| 7,161,148 B1 | 1/2007 | Givargizov et al. | |
| 7,357,018 B2 | 4/2008 | Curry et al. | |
| 7,955,486 B2 | 6/2011 | Yu et al. | |
| 2007/0014148 A1 | 1/2007 | Zhou et al. | |
| 2007/0186627 A1 | 8/2007 | Yi et al. | |
| 2009/0000364 A1 | 1/2009 | Yu | |
| 2011/0073243 A1 | 3/2011 | Yu et al. | |
| 2012/0000770 A1 | 1/2012 | Yu et al. | |

FOREIGN PATENT DOCUMENTS

| | | |
|---|---|---|
| WO | WO 2009/036295 | 3/2009 |
| WO | WO 2011/047240 | 4/2011 |
| WO | WO 2011/116118 | 9/2011 |
| WO | WO 2011/156500 | 12/2011 |

OTHER PUBLICATIONS

Andre et al. (Jun. 5, 2010) "Imaging the Nanoscale Organization of Peptidoglycan in Living *Lactococcus lactis* Cells," *Nature Commu.* 1:1-8.

(Continued)

*Primary Examiner* — Robert Kim
*Assistant Examiner* — Hanway Chang
(74) *Attorney, Agent, or Firm* — Lathrop & Gage LLP

(57) ABSTRACT

Provided are methods and systems for high resolution imaging of a material immersed in liquid by scanning probe microscopy. The methods further relate to imaging a material submersed in liquid by tapping mode atomic force microscopy (AFM), wherein the AFM has a microfabricated AFM probe comprising a nanoneedle probe connected to a cantilever beam. The nanoneedle probe is immersed in the liquid, and the rest of the AFM probe, including the cantilever beam to which the nanoneedle probe is attached, remains outside the liquid. The cantilever is oscillated and the nanoneedle probe tip taps the material to image the material immersed in liquid. In an aspect, the material is supported on a shaped substrate to provide a spatially-varying immersion depth with specially defined regions for imaging by any of the methods and systems of the present invention.

29 Claims, 15 Drawing Sheets

OTHER PUBLICATIONS

Ashby, P.D. (Dec. 17, 2007) "Gentle Imaging of Soft Materials in Solution with Amplitude Modulation Atomic Force Microscopy: Q Control and Thermal Noise," *Appl. Phys. Lett.* 91(25):254102.

Bloomfield et al. (Feb. 1967) "Frictional Coefficients of Multisubunit Structures. I. Theory," *Biopolymers* 5(2):135-148.

Cho et al. (Web Release Apr. 12, 2010) "Tunable and Broadband Nonlinear Nanomechanical Resonator," *Nano Letters* 10:1793-1798.

Ebeling et al. (Mar. 10, 2006) "Imaging of Biomaterials in Liquids: A Comparison Between Conventional and Q-Controlled Amplitude Modulation ('Tapping Mode') Atomic Force Microscopy," *Nanotechnology* 17:S221.

Fukuma et al. (Web Release Jul. 12, 2005) "True Atomic Resolution in Liquid by Frequency-Modulation Atomic Force Microscopy," *Appl. Phys. Lett.* 87(3):034101.

Fukuma et al. (2009) "Biological Application of FM-AFM in Liquid Environment," In; *Noncontact Atomic Force Microscopy* S. Morita, F. J. Giessibl, R. Wiesendanger, Eds., Springer, Berlin vol. 2, pp. 329-345.

Garcia et al. (Sep. 2002) "Dynamic Atomic Force Microscopy Methods," *Surf. Sci. Rep.* 47(6-8):197-301.

Garcia et al. (Jun. 2007) "Nanoscale Compositional Mapping with Gentle Forces," *Nat. Mater.* 6:405-411.

Giessibl, F.J. (Jul. 29, 2003) "Advances in Atomic Force Microscopy," *Rev. Mod. Phys.* 75:949-983.

Hansma et al. (Feb. 3, 1989) "The Scanning Ion-Conductance Microscope," *Science* 243:641-643.

Hansma et al. (1994) "Tapping Mode Atomic Force Microscopy in Liquids," *Appl. Phys. Lett.* 64(13):1738-1740.

Henderson et al. (Sep. 25, 1992) "Actin Dynamics in Living Glial Cells Imaged by Atomic Force Microscopy," *Science* 257:1944-1946.

Herruzo et al. (Web Release Oct. 2, 2007) "Frequency Response of an Atomic Force Microscope in Liquids and Air: Magnetic Versus Acoustic Excitation," *Appl. Phys. Lett.* 91(14):143113.

Hu et al. (Jul. 16, 2010) "Meniscus-Confined Three-Dimensional Electrodeposition for Direct Writing of Wire Bonds," *Science* 329(5989):313-316.

Humphris et al. (Web Release Sep. 19, 2000) "Active Filament Quality Factor Control in Liquids for Force Spectroscopy," *Langmuir* 16(21):7891-7894.

Jacobson et al. (2007) "Lipid Rafts: At a Crossroad Between Cell Biology and Physics," *Nature Cell Bio.* 9:7-14.

Jäggi et al. (Jul. 12, 2001) "Detailed Analysis of Forces Influencing Lateral Resolution for Q-Control and Tapping Mode," *Appl. Phys. Lett.* 79(1):135-137.

Jai et al. (Web Release Sep. 27, 2006) "Wetting an Oscillating Nanoneedle to Image an Air-Liquid Interface at the Nanometer Scale: Dynamical Behavior of a Nanomeniscus," *Nano Lett* 6(11):2554-2560.

Korchev et al. (Aug. 1997) "Scanning Ion Conductance Microscopy of Living Cells," *Biophys. J.* 73:653-658.

Korchev et al. (Web Release Aug. 16, 2000) "Functional Localization of Single Active Ion Channels on the Surface of a Living Cell," *Nature Cell Bio.* 2:616-619.

Kuznetsov et al. (Nov. 1997) "Atomic Force Microscopy Studies of Living Cells: Visualization of Motility, Division, Aggregation, Transformation, and Apoptosis," *J. Struct. Biol.* 120(2):180-191.

Legleiter et al. (Web Release Oct. 14, 2005) "Insights into Fluid Tapping-Mode Atomic Force Microscopy Provided by Numerical Simulations," *Appl. Phys. Lett.* 87:163120.

Maali et al. (Web Release Mar. 29, 2005) "Hydrodynamics of Oscillating Atomic Force Microscopy Cantilevers in Viscous Fluids," *J. Appl. Phys.* 97(7):074907.

Minary-Jolandan et al. (Web Release Aug. 20, 2009) "Nanomechanical Heterogeneity in the GAP and Overlap Regions of Type I Collagen Fibrils with Implications for Bone Heterogeneity," *Biomacromolecules* 10(9):2565-2570.

Minary-Jolandan et al. (2009) "Uncovering Nanoscale Electromechanical Heterogeneity in the Subfibrillar Structure of Collagen Fibrils Responsible for the Piezoelectricity of Bone," *ACS Nano* 3:1859-1863.

Minary-Jolander et al. (2009) "Nanoscale Characterization of Isolated Individual Collagen Type I Fibrils: Polarization and Piezoelectricity," *Nanotechnology* 20:085706.

Minary-Jolandan et al. (2008) "An Improved in Situ Measurement of Offset Phase Shift in Quantitative Dynamic Nanoindentation with AFM," *Ultramicroscopy* 108:821-825.

Mirkin, C.A. (Web Release Sep. 28, 2007) "The Power of the Pen: Development of Massively Parallel Dip-Pen Nanolithography," *ACS Nano* 1(2):79-83.

Pelling et al. (Aug. 20, 2004) "Local Nanomechanical Motion of the Cell Wall of *Saccharomyces cerevisiae*," *Science* 305:1147-1150.

Popescu et al. (Nov. 20, 2006) "Optical Measurement of Cell Membrane Tension," *Phys. Rev. Lett.* 97(21):218101.

Preiner et al. (Jul. 25, 2007) "Higher Harmonic Atomic Force Microscopy: Imaging of Biological Membranes in Liquid," *Phys. Rev. Lett.* 99(4):046102.

Putman et al. (1994) "Tapping Mode Atomic Force Microscopy in Liquid," *Appl. Phys. Lett.* 64(18):2454.

Radmacher et al. (Sep. 25, 1992) "From Molecules to Cells: Imaging Soft Samples with the Atomic Force Microscope," *Science* 257:1900-1905.

Rodriguez et al. (Jun. 30, 2003) "Theory of Q Control in Atomic Force Microscopy," *Appl. Phys. Lett.* 82(26):1584790.

Sader, J.E. (Jul. 1, 1998) "Frequency Response of Cantilever Beams Immersed in Viscous Fluids with Applications to the Atomic Force Microscope," *J. Appl. Phys.* 84(1):64-76.

Shevchuk et al. (Mar. 27, 2006) "Imaging Proteins in Membranes of Living Cells by High-Resolution Scanning Ion Conductance Microscopy," *Angew. Chem.* 45(14):2212-2216.

Stukalov et al. (Web Release Mar. 28, 2006) "Relative Humidity Control for Atomic Force Microscopes," *Rev. Sci. Instrum.* 77(3):033704.

Suryavanshi et al. (2007) "Electrochemical Fountain Pen Nanofabrication of Vertically Grown Platinum Nanowires," *Nanotechnology* 18:105305.

Suryavanshi et al. (2006) "Probe-Based Electrochemical Fabrication of Freestanding Cu Nanowire Array," *Appl. Phys. Lett.* 88:083103.

Tamayo et al. (2000) "Piconewton Regime Dynamic Force Microscopy in Liquid," *Appl. Phys. Lett.* 77(4):582-584.

Tamayo et al. (Jul. 2001) "High-Q Dynamic Force Microscopy in Liquid and Its Application to Living Cells," *Biophys. J.* 81:526-537.

van Meer et al. (Feb. 2008) "Membrane Lipids: Where they are and How they Behave," *Nature Reviews Molecular Cell Biology* 9:112-124.

Xu et al. (Web Release Aug. 7, 2007) "Comparative Dynamics of Magnetically Acoustically, and Brownian Motion Driven Microcantilevers in Liquids," *J. Appl. Phys.* 102(3):034303.

Yamada et al. (2006) "AFM Measurement in Liquid," *Roadmap of Scanning Probe Microscopy; Nanoscience and Technology* :101-108.

Yum et al. (2011) "Bio-Functionalized Nanoneedles for the Direct Transfer and Site-Selective Delivery of Probes into Living Cells," *Biochemica et Biophsica Acta* 1810:330-338.

Yum et al. (2009) "Mechanochemical Delivery and Dynamic Tracking of Single Fluorescent Quantum Dots in the Cytoplasm and Nucleus of Living Cells," *Nano Lett.* 9:2193-2198.

Yum et al. (2010) "Electrochemically-Controlled Deconjugation and Delivery of Single Quantum Dots into the Nucleus of Living Cells," *Small* 6:2109-2113.

Yum et al. (2010) "Nanoneedle: A Multifunctional Tool for Biological Studies in Living Cells," *Nanoscale* 2:363-372.

Yum et al. (Oct. 1, 2004) "Experimental Measurement and Model Analysis of Damping Effect in Nanoscale Mechanical Beam Resonators in Air," *J. Appl. Phys.* 96(7):3933-3938.

Yum et al. (Web Release Dec. 8, 2007) "Individual nanotube-based needle nanoprobes for electrochemical studies in picoliter microenvironments." *ACS Nano* 1(5):440-448.

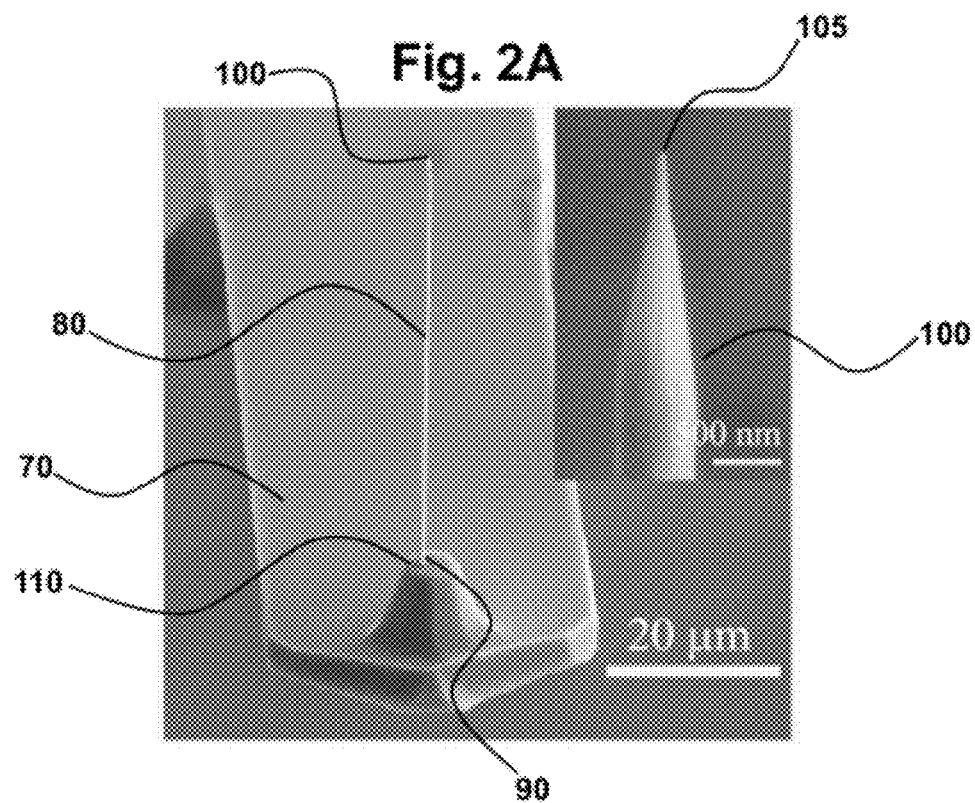

ULTRA-LOW DAMPING IMAGING MODE RELATED TO SCANNING PROBE MICROSCOPY IN LIQUID

STATEMENT REGARDING FEDERALLY SPONSORED RESEARCH OR DEVELOPMENT

This invention was made with government support under CBET 0731096 awarded by the National Science Foundation. The government has certain rights in the invention.

CROSS-REFERENCE TO RELATED APPLICATIONS

Not applicable.

BACKGROUND OF INVENTION

Methods and devices provided herein relate to a new imaging mode for scanning probe microscopy in a liquid environment. The specific design and methodology, for example, provides atomic force microscopy (AFM) imaging of a material covered in liquid, where the AFM probe, when dynamically operated, experiences a significantly lowered damping and has a corresponding increase in Q factor when compared to conventional systems, thereby achieving high sensitivity and high resolution dynamic imaging of samples in liquid.

Conventional AFM systems, when imaging material in liquid, submerse the cantilever portion of the AFM probe in the liquid. The relatively large footprint of the cantilever (typically having an area of about 40 µm by 300 µm) in liquid (such as water) is associated with high hydrodynamic damping and low quality factor when it is driven to resonant oscillation. Although such systems may satisfactorily operate in air (due to the small viscosity of air, the associated hydrodynamic damping experienced by the AFM probe is small), they are not ideal for imaging material submersed in liquid. The significant hydrodynamic drag experienced by the AFM probe fully submersed in liquid results in low image resolution. This disadvantage is even more pronounced when imaging soft materials in liquid, where the tapping mode operation (e.g., the AFM probe in dynamic oscillation) and the use of small AFM tip-sample interaction forces are required to avoid unwanted deformation or damage to the soft material. Large hydrodynamic damping, low Q factor, high thermal noise, and large tip-sample interaction related to the use of an AFM probe operated in the dynamic AFM imaging mode all contribute to the problem of obtaining accurate and high resolution information about the sample material being imaged.

These drawbacks become particularly relevant in certain applications, such as the imaging of living biologic materials, including cultured biological cells, characterized as "soft" (e.g., eukaryotic animal cells). To remain viable, such a material must be immersed in suitable liquid (e.g., culture media), and cannot be subject to large contact forces from an AFM tip. The requirements for liquid media and low contact forces, however, directly impact the ability of AFM to achieve high resolution imaging. Accordingly, there is a need in the art for scanning probe microscopy systems capable of high resolution imaging of materials immersed in liquid, including soft materials where the contact force between the scanning probe and the material must be sufficiently small to avoid unwanted material deformation or damage.

SUMMARY OF THE INVENTION

Provided are systems and methods related to scanning probe microscopy of materials immersed in liquid. In particular, the systems and devices relate to a nano-sized probe such as a nanoneedle that is immersed in the liquid to scan the material of interest. In contrast to conventional systems, where the cantilever beam would be immersed in the liquid, the systems and methods provided herein ensure only the nano-sized probe is immersed in the bulk liquid material. In this manner, the scanning probe microscopy systems provided herein have ultra-low damping and high resolution imaging of materials submersed in liquid. Particular advantages include the ability to image materials that are extremely soft without generating unwanted forces on the material surface, while maintaining good resolution, including nanoscale resolution.

Conventional scanning microscopy systems, including AFM systems used for imaging materials in liquid, suffer from substantial hydrodynamic damping problems associated with the AFM probe, particularly when operated in dynamic mode, making extraction of meaningful data difficult and, at times, impossible. Hydrodynamic damping is associated with a decreased Q factor of the AFM probe and attendant decrease in image resolution. Furthermore, to sustain the dynamic oscillation of the AFM probe necessary for AFM imaging under the continued influence of high hydrodynamic damping, the AFM probe must be driven continuously with a large periodic force, which results in high tip-sample interaction force, and those high forces can lead to damage to the sample material, particularly fragile biological materials. These problems are overcome herein by ensuring a nano-sized probe is immersed in the liquid medium, and the other microscopy components, such as the AFM cantilever, remain outside the liquid. The significantly reduced size (compared to the 40 µm by 300 µm footprint size of a typical AFM cantilever) that is dynamically interacting with liquid effectively decreases hydrodynamic damping involved in the AFM probe, increases the Q factor of the probe, minimizes the force needed to drive the AFM probe, and consequently minimizes the tip-sample interaction force required for stable AFM imaging, which enables high-resolution imaging of material submersed in a liquid. In addition to the increased resolving power when imaging in liquid, restricting the portion of the system immersed in liquid to the nanoneedle eliminates the need to passivate the cantilever for certain electrical or electrochemical measurement related applications, since only the nanoneedle is immersed in the fluid. Another advantage is that the need for costly and complex circuitry for active Q factor control (which may or may not improve imaging resolution) to image materials submersed in liquid is eliminated.

In an embodiment, provided is a method of imaging a material submersed in liquid by dynamic mode (tapping mode) atomic force microscopy. A material is submersed in liquid, wherein the material has a submersion depth in the liquid, indicating that at least part of the material surface is covered by liquid. Alternatively, the entire material is immersed in liquid. To image the submersed or immersed material, a microfabricated atomic force microscope probe is provided, comprising a cantilever beam having a distal end and a nanoneedle probe having a first end connected to the distal end of the cantilever beam and a second end ending in a tip. The nanoneedle probe has a longitudinally-extending axis extending between the first end and said second end that is substantially perpendicular to a surface of the cantilever beam distal end. At least a portion of the nanoneedle is immersed in the liquid, wherein the immersed portion is sufficient for the tip end to contact the material submersed in liquid while ensuring the cantilever beam remains outside the liquid. In this aspect, a portion or the entire nanoneedle is in the liquid and the entire other portion of the probe, including the cantilever beam to which the nanoneedle is connected, remains outside the liquid. The cantilever beam is oscillated at an oscillating frequency, wherein the nanoneedle probe tip taps the material during the oscillation, thereby imaging the material in liquid.

In an aspect, the methods and systems provided herein may be further characterized by a submersion depth, such as the distance from the liquid interface to the material surface that is being imaged. In one embodiment of this aspect, the submersion depth is less than or equal to 200 µm. In another embodiment, the submersion depth is selected from a range that is greater than or equal to 1 µm and less than or equal to 200 µm. In another embodiment, the range is selected from a range that is greater than or equal to 10 µm. "Liquid interface" refers to the interface formed between the bulk liquid and the bulk gas or air overlaying the liquid.

In an embodiment, the nanoneedle has a diameter that is substantially uniform in a middle portion between the nanoneedle probe first end and second end. In an aspect, middle portion refers to the portion of the nanoneedle extending from a point midway between the nanoneedle ends, such as a total extension that is about 50%, about 75%, or about 90% the entire nanoneedle length.

In an aspect, the nanoneedle has a length selected from a range that is greater than or equal to 20 µm and less than or equal to 500 µm. In an aspect, the nanoneedle length is greater than the maximum depth defined by the material surface to be imaged and the liquid interface.

In another aspect, the nanoneedle has an aspect ratio defined by the ratio of nanoneedle length to nanoneedle characteristic width, wherein the aspect ratio is selected from a range that is greater than or equal to 20 and less than or equal to 250.

In an embodiment, the nanoneedle in the liquid has a nanoneedle immersion length that is selected from a range that is greater than or equal to 1 µm and less than or equal to 200 µm. In an aspect, the nanoneedle free end is shaped. In an embodiment of this aspect, the nanoneedle tip end is tapered and has a curved end surface with a radius of curvature that is less than or equal to 100 nm.

In an aspect, the method relates to oscillating the probe, including the cantilever beam, at a user-specified oscillation frequency. In an aspect, the oscillation frequency is selected from a range that is greater than or equal to 1 kHz, greater than or equal to 100 kHz, greater than or equal to 500 kHz, or between about 1 kHz and 10 MHz.

In an embodiment, the vertically oscillating nanoneedle has a hydrodynamic interaction cross sectional area in liquid that is less than or equal to 10 µm$^2$, less than or equal to 1 µm$^2$, less than or equal to 0.1 µm$^2$, or less than or equal to 0.01 µm$^2$. A 10 µm$^2$ hydrodynamic interaction cross-sectional area corresponds to, for example, a nanoneedle having a diameter of about 3.3 µm.

In an aspect, the methods and systems of the present invention are further described in terms of an intrinsic Q-factor and/or the energy dissipation for the oscillating nanoneedle in liquid. In an aspect, the energy dissipation is low, corresponding to atomic force microscope probe having an intrinsic Q-factor that is greater than or equal to 10, greater than or equal to 100, or greater than or equal to 200, when the nanoneedle portion is immersed and oscillating in the liquid. In this aspect, "low" is used comparatively to conventional AFM systems. The actual amount of energy dissipation depends on operating conditions such as the oscillation frequency and amplitude of the nanoneedle.

In an aspect, the probe tip tapping with the material generates an average contact force between the nanoneedle tip end and the material surface that is less than or equal to 1 nN, less than or equal to 0.5 nN, or less than or equal to 0.1 nN. Such contact forces are particularly useful for imaging a soft or highly elastic material, or a material that is easily damaged.

In an embodiment, the nanoneedle has a length and the immersed nanoneedle portion is less than or equal to the nanoneedle length. In an aspect, the nanoneedle immersed portion is less than or equal to 90%, less than or equal to 50%, or less than or equal to 25% the nanoneedle length. In an aspect, the immersed portion is less than or equal to 50%, such as the distal longitudinal half of the nanoneedle. In an aspect, the immersion depth is described in absolute terms, such as less than or equal to 60 µm.

In an embodiment, any of the methods or devices provided herein relate to supporting the material to be imaged on a curved substrate. In this embodiment, the material is covered in the liquid and the curved substrate provides a spatially-varying liquid immersion depth. In an aspect, certain locations are covered by liquid that is greater than the nanoneedle length, and other portions are covered by liquid that is less than the nanoneedle length. The material is imaged at a location wherein the liquid immersion depth is less than the nanoneedle length. This embodiment can be particularly useful where it is desirous to have as large volume of liquid covering the to-be-imaged material as possible, including where it is advantageous to ensure minimal or no exposure of material to a non-liquid environment (e.g., air or other gaseous environment overlaying the liquid). In addition, a curved substrate can be used to more accurately provide an immersion depth over a well-defined region that is less than or equal to the nanoneedle length, such as less than or equal to 200 µm, less than or equal to 100 µm, or less than or equal to 60 µm. In this aspect, a majority of the biological material may be well-covered by liquid, and a relatively smaller portion of biological material covered with only a thin layer of liquid.

In an aspect, the material supported on a substrate is part of a container for holding the liquid. In an aspect, the curved substrate is concave-shaped and part of a container having an outer edge or wall for holding or containing liquid, and said imaging is performed in a liquid-covered region adjacent to the container outer edge. The concave substrate can be shaped to ensure the liquid-covered region adjacent to the container edge is less than or equal to the nanoneedle length, and other more centrally-located material regions are covered in liquid having an immersion depth significantly greater than the nanoneedle length.

In an aspect, any of the methods or devices are used to image a material that is soft, such as a soft material having a Young's modulus that is less than or equal to 100 MPa, 1 MPa, 100 kPa, 10 kPa or 1 kPa. In an embodiment, the material is a biological organism. In an embodiment, the biological material is fixed. In an embodiment, the soft material is a biological material that is living, such as a living mammalian cell. Other examples of biological material include non-living constituents of living tissue, such as connective components including collagen, elastin, bone and components thereof. In an aspect, any of the methods and devices may be used to image a microscale or a nanoscale feature on a surface of the biological organism.

In an embodiment, the method may further be described in terms of the average force associated with the tip tapping of the material. In an aspect, the tip tapping is at an average force that is at least 10-fold smaller than a corresponding tapping force for an equivalent atomic microscope probe without the nanoneedle portion and with the cantilever beam submersed in the liquid. This functional characteristic is particularly relevant as the capability of tapping at smaller forces provides the important functional benefit of being able to resolve smaller tip-sample forces, and also does not undesirably deform relatively soft material.

The methods and devices provided herein are not limited to any specific material, but instead relate to material that is imaged under a liquid layer. Examples of various materials include: soft tissue, biological cell, biomolecule, nanowire, nanotube, planar material, chemically functionalized surface, biologically functionalized surface, polymer surface, gel surface, self-assembled monolayer, synthetic lipid membrane, tissue engineered scaffold, membrane filter, flexible electronic device, Micro-Electro-Mechanical Systems (MEMS) device, biosensor, and chemical sensor. "Planar" refers to a material that covers a surface substrate. Nanowire and nanotubes refer to structures having a diameter that is less than 1 µm. A functionalized surface refers to a surface that has been processed to specifically recognize a biological or a chemical substance, such as by providing a chemical or biological material that specifically binds an analyte. In a biological context, the binding can be by receptor/protein, antibody, polynucleotide, and polypeptide. A chemically functionalized surface is provided by coating a surface with a chemical specific for an analyte.

The methods and devices provided herein are particularly useful for measuring an interaction force between the nanoneedle tip and a material's surface, such as an interaction force arising from a change on a material surface. In an aspect, the change in the material surface corresponds to chemical composition; biological composition; surface composition; mechanical stiffness variation; mechanical viscoelastic property variation, surface adhesion variation, electrical charge distribution, or magnetic property variation.

In an aspect, the method relates to a nanoneedle that is surface-processed, such as surface-passivated or surface-functionalized, or both. A nanoneedle can be surface-functionalized to provide strong physical interaction with a chemical or biological substance or analyte. In an aspect, the method further comprises identifying the chemical or biological substance by tapping a functionalized nanoneedle against the material, wherein the functionalization provides specificity to the type of tip-sample interaction, and thus the substance or analyte.

In an aspect, passivation refers to reducing the influence of a physical property of the environment surrounding the nanoneedle. In an embodiment the physical property is electrical conductivity between the liquid and the nanoneedle. For example, any of the methods provided herein optionally relate to coating a portion of the nanoneedle with a thin film layer of electrically insulating material, wherein the nanoneedle tip is not coated, thereby electrically insulating the coated nanoneedle portion from the liquid. In an aspect, such a passivated nanoneedle can be used in Conductive AFM or in Electrochemical AFM for mapping surface conductivity variation or electrochemical activities over a sample surface submersed in liquid with increased spatial resolution and sensitivity. The passivation of the nanoneedle (except at the nanoneedle tip end) submersed in liquid significantly reduces the active electrode area for electrical or electrochemical measurement, and thus significantly reduces the background noise and improves the signal to noise ratio in such measurement. Exposing only the very end of the nanoneedle as the active electrode area effectively confines the electrical field near the tip for local electrical and electrochemical measurement and thus significantly improves the spatial resolution in mapping the variation across a sample surface.

In an embodiment, the outer surface of the nanoneedle is coated with an electrically insulating coating. An electrically insulating coating adheres to and covers the nanoneedle surface. An insulating coating may cover all or part of the nanoneedle surface, including the nanoneedle tip. However, the insulating coating on the nanoneedle tip may be removed by chemical etching, localized electrical sparking, or by focused ion beam etching in a subsequent step after coating. One technique for coating a nanoneedle with an insulating material is described in Yum et al. "Individual nanotube-based needle nanoprobes for electrochemical studies in picoliter microenvironments." ACS Nano 1(5):440-448 (2007), which is specifically incorporated by reference. Other techniques for coating metallic wires with insulating coatings are known to the art, including, but not limited to, physical and chemical vapor deposition techniques. If these coating techniques also cover the nanoneedle tip, the coating on the nanoneedle tip may be etched away or polished off so that the insulating coating does not completely cover the end of the conductive needle, or otherwise a small end segment can be cut off to expose the conductive core (see also US Pat. Pub. No. 2009-0000364).

In an aspect, the nanoneedle is a metallic nanowire deposited onto the conductive cantilever beam by a meniscus-confined electrodeposition method. In an aspect, the meniscus-confined electrodeposition method corresponds to any of the methods provided in 61/352,590 ("Meniscus-Confined Three-Dimensional Electrodeposition for Direct Writing of Wire Bonds *Science* 329(5989): 313-316 (2010)) and U.S. patent application Ser. No. 12/034,365 (US Pub. No 2009-0000364), each of which is hereby incorporated by reference to the extent not inconsistent herewith.

Briefly, in an embodiment, the meniscus-confined 3-D electrodeposition of the nanoneedle on the AFM cantilever probe distal surface utilizes an electrolyte-containing reservoir such as a micropipette with a microscopic/nanoscopic dispensing nozzle as the working toolbit. The nozzle can be from several micrometers down to 100 nm in diameter. As the electrolyte reservoir approaches a conductive substrate surface to a close proximity, a meniscus (a liquid bridge) is established between the dispensing nozzle and the substrate surface. The meniscus therefore confines a volume of electrolyte between the reservoir and the substrate surface. With an appropriate electrical potential applied between the electrolyte contained in the reservoir and the substrate surface, electrodeposition is initiated within this volume of electrolyte. In an embodiment, the withdrawal speed of the reservoir and the electrochemical deposition parameters are selected together to form a stable meniscus between the nozzle of a given electrolyte reservoir and the electrodeposited structure. For example, by the choice of an appropriate withdrawal speed of the reservoir defined by the dynamic stability of meniscus and the electrochemistry involved in the deposition, a stable meniscus formation can be maintained between the nozzle and the growth front of the electrodeposited structure. It has been found that selection of such an appropriate withdrawal speed can allow continuous growth of the off-surface micro-/nano-wires of high surface quality and uniform diameter to be realized and sustained.

In an embodiment, the method further relates to an immersing step that comprises inserting the nanoneedle probe in the liquid at an insertion angle, wherein the insertion angle is substantially perpendicular to said liquid surface. In an aspect, the nanoneedle probe is deposited onto the cantilever beam at an angle, so as to ensure the insertion of the nanoneedle probe in the liquid is substantially perpendicular. In an aspect, "substantially perpendicular" refers to an angle that is within 15°, within 10°, within 5°, or is approximately perpendicular, with respect to the liquid/air interface.

In another embodiment, any of the methods provided herein further relate to retrofitting conventional AFM probes and systems with the described nanoneedle probe, so that a conventional AFM system can be readily adapted for imaging materials submersed in liquid with the nanoneedle AFM probe. In an aspect, this retrofitting is by the meniscus-confined electrodeposition method to fabricate the nanoneedle AFM probe. In this manner, already existing imaging controls from the AFM systems are used once the nanoneedle AFM probe is engaged on the sample surface.

Provided herein is a high resolution atomic force microscope system for imaging materials immersed in a liquid, including systems for employing any of the processes of the present invention. In an aspect, the system comprises an atomic force microscope with an atomic force microscope probe having a cantilever beam with a distal end and a nanoneedle probe having a first end bonded to the cantilever beam distal end. The nanoneedle probe second end is a tapered probe tip, wherein the nanoneedle probe has a longitudinally-extending axis extending between the first end and the second end that is substantially perpendicular to a surface of the cantilever beam distal end. In this context, "substantially perpendicular" refers to the longitudinally-extending axis of the nanoneedle being configured so that the nanoneedle can be immersed in the liquid so that the tip contacts the material, while ensuring the cantilever beam remains outside the liquid during the imaging. In an aspect, substantially perpendicular refers to the longitudinally-extending axis being within 30°, within 20°, within 10°, or within 5° of perpendicular with respect to the cantilever beam surface to which the nanoneedle is connected. The nanoneedle length is the distance between the first and second ends along the longitudinally-extending axis. The system further comprises a container for holding a material submersed in a liquid, wherein the container has a bottom surface shaped to provide a spatially varying submersion depth, wherein a portion of the material is submersed in liquid having a submersion depth that is less than the distance between the nanoneedle first and second ends, so that the cantilever beam is outside the liquid during material imaging.

In an embodiment, the bottom surface shape is curved, such as a concave shape with respect to the liquid that covers the material. "Concave shape" refers to a curved substrate having a central portion that is lower than an outer portion, such as an outer portion corresponding to a region adjacent to side walls of the container. In an embodiment, the bottom surface shape comprises microchannels having a depth that is less than or equal to the distance between the nanoneedle first and second ends. In this aspect, microchannel refers to a channel having a width that is less than or equal to 10 mm, less than or equal to 1 mm, or selected from a range that is between about 10 μm and 1 mm. In an aspect, there is a plurality of microchannels.

Without wishing to be bound by any particular theory, there can be discussion herein of beliefs or understandings of underlying principles or mechanisms relating to embodiments of the invention. It is recognized that regardless of the ultimate correctness of any explanation or hypothesis, an embodiment of the invention can nonetheless be operative and useful.

DETAILED DESCRIPTION OF THE INVENTION

Figure 1:
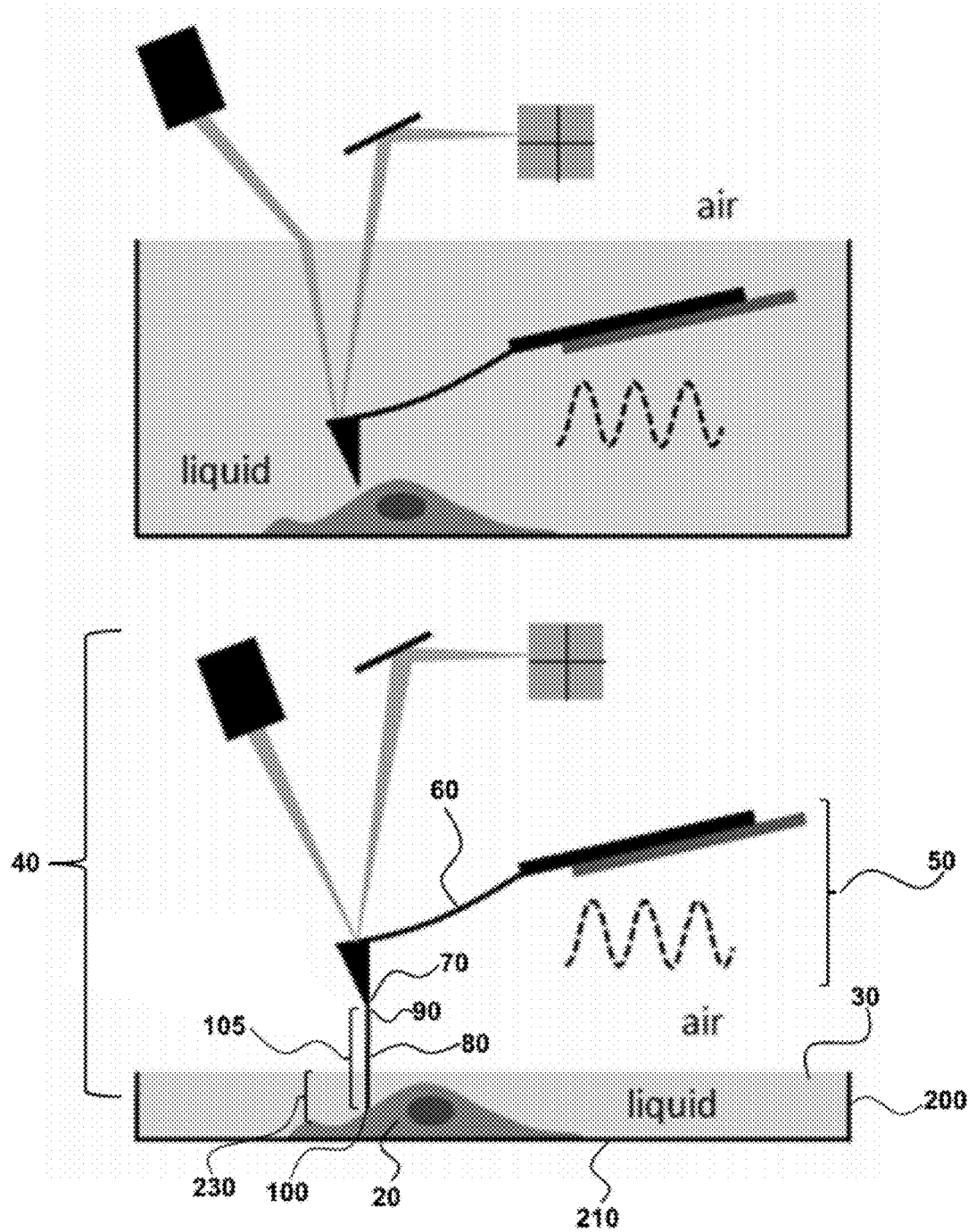
FIG. 1. Schematics comparing the traditional (top panel) tapping mode AFM operation in liquid and the "trolling mode" AFM operation with the use of a nanoneedle probe system (bottom panel). The top panel illustrates traditional tapping mode AFM in liquid that submerses the entire cantilever system in liquid, which introduces high hydrodynamic damping and low quality factor in the dynamic system. The bottom panel illustrates the "trolling mode" AFM that keeps the cantilever beam system in air and uses a solid and mechanically stable nanoneedle as an extended tip to scan a sample submersed under a shallow liquid medium and retains a high intrinsic Q-factor performance.

"Imaging" is used broadly to refer to obtaining useful information about a material. In one aspect, imaging relates to generating an optical image of a material, so that a surface image is generated. The term, however, is broader in that other information can be obtained and analyzed. For example, surface composition, or other physical parameter such as surface charge, magnetic field, stiffness, viscoelasticity, or surface adhesion can be "imaged" using any of the methods or devices provided herein.

"Tapping mode" is used synonymously with dynamic mode and refers to a cantilever oscillated at or near its oscillation frequency, thereby correspondingly oscillating the nanoneedle probe that is attached to a cantilever beam distal surface. Oscillation amplitude, resonance frequency, and phase are modified by nanoneedle tip-material interaction forces. Changes in any of these oscillation parameters provide information about the material's characteristics. Static mode, in contrast, refers to a probe tip that is dragged across a material surface. Accordingly, in tapping mode the probe tip periodically contacts the material surface, and this periodic contact is referred to as a "tap" and can be further characterized by a "contact force" between the material and the tip.

"Material" is used broadly to refer to the object being imaged or sensed by the AFM system. The material can be biologic or non-biologic. The material can be soft or relatively stiff. The material can be a composite, such as made up of a soft material and a rigid material. The soft material may overlay the rigid material. The material may be planar in nature in that it covers a substrate or portion thereof. Alternatively, the material may be a non-planar feature, such as a wire or tube, including features that are micro or nano-sized (e.g., having a characteristic dimension that is less than 1 mm or less than 1 µm).

"Submersed" is used to refer to a material that is placed under a liquid so that upon imaging with an AFM microscope, at least a portion of an AFM probe must be immersed in the liquid to provide adequate interaction between the probe tip and the material. Accordingly, "immersion" is used to describe the nanoneedle portion that is introduced to or positioned in the liquid so that the material can be imaged or sensed (without immersing any of the cantilever beam to which the nanoneedle is connected). In an aspect, the material is completely covered in liquid. The methods and devices provided herein can be used with any number of liquids and liquid compositions. For example, the liquid may be selected depending on the material that is to be imaged. Imaging living biological material dictates a liquid composition (e.g., cell culture media) that may be very different than for imaging non-living material such as fixed biological tissue or cells, inorganic material or a synthetic material.

"Immersion depth" refers to the distance between the liquid/air interface and bottom surface substrate, or to the surface of the material being imaged. A "spatially varying" immersion depth refers to the shaping of the bottom surface substrate to provide an immersion depth that varies with position on the bottom substrate surface. "Air" is used generically to refer to the bulk gas-phase that overlays the liquid phase. In an aspect, air can refer to atmospheric room air.

"Immersion length" refers to the wetted length of the nanoneedle, such as the length of the nanoneedle portion that is immersed in the liquid that covers the material to be imaged. In an aspect, the entire nanoneedle is immersed in the liquid. In an aspect, only a portion of the nanoneedle is immersed in the liquid, such as less than the length of the nanoneedle portion, including less than 90%, less than 70%, less than 50%, less than 30%, less than 10%, or any sub-range thereof. Generally, as the absolute length of the nanoneedle decreases, the corresponding percentage of nanoneedle immersed increases.

"Nanoneedle" refers to the nano-sized portion of the probe that is immersed in the liquid. Nanoneedle is used broadly to refer to a structure having a longitudinal length and a dimension perpendicular to the longitudinal length that is less than or equal to 1 µm, less than or equal to 500 nm, less than or equal to 100 nm, or less than or equal to 50 nm. In an aspect, the perpendicular dimension relates to an outer diameter for a substantially cylindrical shaped nanostructure such as a hollow tube or a solid wire. Alternatively, perpendicular dimension relates to a characteristic width or a height for a nanostructure that is not cylindrically-shaped. In an aspect, the nanostructure has a length that is not on a nanometer-dimension scale, such as greater than or equal to 1 µm, greater than or equal to 10 µm, greater than or equal to 50 µm, or greater than or equal to 20 µm and less than or equal to 500 µm.

"Substantially" is used to refer to a number of different physical parameters. Unless otherwise defined, "substantially" refers to a value that is within 20% of ideal, including within 10%, within 5%, or within 1%.

"Contact" is used broadly to refer to an interaction between the material and the probe tip end. In an aspect, contact refers to physical contact between the tip end and the surface of the material. In an aspect, contact refers to a material parameter affecting oscillation of the probe without necessarily physical contact, such as by variation in magnetic field, charge, or material composition resulting in generation of a force or a force change at a distance.

"Hydrodynamic interaction cross sectional area" refers to the cross-section area of the nanoneedle. In an aspect, the hydrodynamic interaction cross sectional area is defined by the nanoneedle characteristic dimension. In an aspect, the characteristic dimension is the diameter of the nanoneedle immersed in liquid. Alternatively, the hydrodynamic interaction cross sectional area is defined by the cross-sectional area of the nanoneedle, such as for a circular cross-sectional area of $\pi/4D^2$, where D is the diameter of the immersed portion of the nanoneedle probe.

"Characteristic width" refers to a dimension provided to the nanoneedle that is related to the hydrodynamic interaction between the nanoneedle and the liquid in which the nanoneedle is immersed. In an aspect, the "characteristic width" is a diameter. For a nanoneedle having an irregularly-shaped circular cross-section, the characteristic width may correspond to an average diameter or to a maximum diameter, either within a single cross-sectional slice or over a portion along the longitudinal axis.

"Hydrodynamic interaction energy dissipation" relates to how rapidly an oscillating nanoneedle probe motion degrades due to viscous drag by the surrounding liquid. Higher energy dissipation values reflect higher viscous drag between the probe surface and surrounding liquid. The nanoneedle configuration provided herein is particularly useful because the small hydrodynamic interaction cross-sectional area provides a correspondingly small hydrodynamic interaction energy dissipation. This is useful in providing increased resolving power when imaging in liquid compared to conventional systems.

"Q-factor" refers to the quality factor of the AFM probe. Generally, it is a dimensionless parameter that reflects how rapidly oscillations of the probe degrade and die out. High Q-factor probes suffer relatively low energy loss during oscillation compared to low Q-factor probes. Accordingly, a conventional AFM probe without a nanoneedle for liquid immersion, will be of relatively low Q-factor because the relatively large probe, with high hydrodynamic interaction cross-sectional area (A conventional AFM probe cantilever is about 300 μm long and 40 μm wide), experiences large hydrodynamic interaction energy dissipation associated with viscous drag of the probe oscillating in the liquid. A lower Q-factor AFM probe thus requires more energy input from a drive system to sustain the stable oscillation of the AFM cantilever at a specific amplitude and frequency. The systems disclosed herein, in contrast, have high Q-factors in part because the small hydrodynamic interaction cross-sectional area ensures low hydrodynamic interaction energy dissipation, facilitating ongoing oscillation. "Intrinsic Q-factor" reflects that the probes provided herein do not require any active external action to maintain Q-factor, but instead inherently have the high Q-factor due to the size, positioning and geometry of the system.

"Biological organism" is used broadly to refer to a material that is biologic in origin, such as an individual or a population of biological cells. For example, the biological organism may be cultured cells, or tissue from an animal. The cells may be animal-derived, such as from a mammal. Alternatively, the biological organism may not be an animal, but instead may be bacteria, plant, viral, fungal, or other single-cell organisms.

"Microscale feature" or "nanoscale feature" refers to a feature that is on the order of microns or nanometers, respectively. Examples include, membrane-receptors, proteins, phospholipids, lipids and compositions or clusters thereof.

"Interaction force" refers to a force between the nanoneedle probe and the material being imaged that is measurable by the AFM system, thereby providing useful information about the material. In particular, generation of such a force changes the oscillation parameters of the AFM probe in a detectable manner that is then used to providing information about the material, thereby providing a material "image", "map" or "time course".

"Functionalized" refers to processing the nanoneedle surface to provide additional sensitivity to the material, or component thereof, that is being imaged. For example, the nanoneedle can be chemically or biologically functionalized to better detect a biologic or chemical species. The functionalization may be by attaching a material to the nanoneedle surface, such as by a self-assembled monolayer, biotin-functionalized surface-active molecules, surface chemisorption of a thiol, a protein, an antibody, or a target molecule complex that, in turn, specifically binds or interacts with the species of interest.

"Passivated" refers to processing the nanoneedle surface to provide isolation between the nanoneedle and the surrounding liquid and/or material. The isolation may refer to a physical parameter or to a component of the liquid or material. For example, the physical parameter may be electrical conductivity between the liquid and the nanoneedle, with passivation achieved by coating the nanoneedle surface with a thin film layer of an insulating material. Generally, thin films can have thicknesses from fractions of a nanometer to several microns. However, for coating nanoneedles the thickness of the insulating thin film is typically less than 100 nm. In different embodiments, the thickness of the insulating thin film is from 1 nm to 100 nm, from 1 nm to 50 nm, from 5 nm to 100 nm, or from 5 nm to 75 nm. "Electrically insulating material" refers to insulating material or "dielectrics" that resists the flow of electric charge. Examples of electrically insulating materials include polymers, plastics, glasses, ceramics, and the like. The insulating coating may be a polymer coating deposited with electropolymerization. Electropolymerization coating techniques are known to the art. For example, electropolymerization coating of nanotubes with polyphenol is described Yum et al. (2007, ACS Nano, Vol. 1, No. 5, 440-448). Electropolymerization is expected to coat the exposed portions of the nanoneedle (including its free end). The diameter uniformity and smoothness of the nanoneedle facilitates the reliable passivation with a thin film that does not significantly increase the overall diameter of the passivated nanoneedle and avoids the pin-hole formation within the passivation film that degrades the insulating quality of the deposited passivation film. A portion of the insulating coating at the free end of the nanoneedle can be removed, so that the exposed tip has a length. The end of the nanoneedle may also be exposed by cutting or otherwise removing a segment of the coated nanoneedle (so that there is no exposed length, but rather an exposed interior cross-section of the cut nanoneedle). In an embodiment, the segment of the coated nanoneedle which is removed or cut away is relatively short compared to the total length of the nanoneedle. In different embodiments, the segment removed is less than 25%, less than 10% or less than 5% of the total nanoneedle length. In this embodiment, the portion removed is near the free end of the insulated nanoneedle. For example, the coated nanoneedle can be cut with a focused ion beam or by other methods known to those in the art. Cutting the coated nanoneedle also allows control of the length of the nanoneedle.

EXAMPLE 1

Intrinsically High Q-Factor "Trolling Mode" Scanning Probe Microscopy in Liquid; System Characterization. To be able to interact and image liquid-like cell membranes with high spatial and force resolutions is of significant value for biological studies. The widely used dynamic mode atomic force microscopy (AFM) suffers severe sensitivity degradation and noise increase when operated in a liquid medium. We introduce an alternative imaging scheme with the use of an AFM nanoneedle probe that lowers both the hydrodynamic damping and the thermal fluctuation force experienced by a typical AFM probe by orders of magnitude and acquires an intrinsic Q-factor over 100 without Q-control feedback when operated for AFM imaging in liquid. This allows truly gentle imaging of demanding samples such as the soft membranes of living cells under physiological conditions even with a rigid AFM probe having a force constant over several Newton per meter and a resonance frequency over 200 kHz, and direct monitoring of the dynamic motion of membrane microstructures.

As an indispensable nanoscale tool for experimental studies, atomic force microscopy (AFM) has been widely applied across diverse scientific fields for materials characterization and surface engineering, providing nanoscale spatial resolution in mapping and patterning surfaces and realizing pico-Newton sensitivity sensing of nanoscale interactions[1,2]. By employing a nanoscale probe tip to physically sense the surface of interest, one of the most significant benefits of AFM, over other characterization techniques, is to provide a direct means to access and interrogate the nanoscale site of interest mechanically, electrically, and/or optically by simply integrating the required functionalities into the AFM tip.

This direct access to the sample of interest with AFM is of significant value to biological studies as well, especially at the cellular level. Various elegant methods[3-11] based on the scanning probe techniques, including the scanning ion conductance microscopy, have been developed for the sole purpose of improving the imaging resolution of biological samples in their particular conditions, i.e. biological samples need to be preserved in a liquid medium and are inherently soft. However, a major challenge relates to imaging live mammalian cells with AFM with high resolution and avoiding excessive mechanical deformation simply due to the extreme softness of such cells (on the order of several kPa or less in membrane (cortex) elasticity, much softer than some other cell types with a cell wall such as bacteria)[4,12-15]. To be able to directly image and resolve microscale and nanoscale features on a living cell membrane and visualize the dynamics of the membrane proteins and lipid rafts and their functional activities in vivo can facilitate answering many outstanding biological questions of cell and membrane physiology[16,17]. In order to image such samples with AFM, an AFM probe must exert as a minimal force as possible (down to several tens of pico-Newton) to avoid significantly deforming or scratching the cell membrane during imaging scan. For this reason, the tapping mode (also called the dynamic mode) AFM has been the operational mode of choice for imaging biological samples[13,18-21]. In this mode, an AFM probe oscillating near its resonance makes only intermittent contacts with the sample surface, and the amplitude of the oscillation (instead of the absolute deflection of the AFM cantilever) is monitored and controlled to provide the topographic and other information of the sample surface during the image scan.

The tapping mode AFM, however, suffers one major problem when used for imaging biological samples in liquid. In this mode, the AFM probe is immersed in liquid to access the sample, therefore, the relatively bulky AFM probe, typically several hundred micrometers in length and several tens micrometers in width, experiences large hydrodynamic drag when interacting with the liquid, which drops the Q-factor of the dynamic operation of the AFM probe from around several hundred in air to the order of 1 in liquid[22-25]. The force applied on the sample in the tapping mode AFM is roughly proportional to the needed excitation force on the AFM cantilever described by kA/Q, where k is the spring constant, A is the free oscillation amplitude, and Q is the Q-factor of the AFM cantilever[26]. For a specific dynamic operation at the designated oscillation amplitude, a low Q-factor means high minimal available tapping force for AFM imaging. In order to lower this force for imaging soft samples, a soft probe having a k much smaller than 1 N/m is often used for traditional dynamic operation in liquid, which, besides significantly lowering the operating frequency, still exerts an imaging force large enough that deforms soft mammalian cells.

To more effectively minimize this tapping force, it is desirable to have an intrinsically high Q in the dynamic system when operated in liquid. One method that has been extensively explored to enhance the Q-factor of the dynamic operation in liquid with AFM is the active Q-control[7,26-29], where an external feedback control circuitry dynamically boosts the resonance oscillations and tunes down the non-resonance oscillations of the cantilever by actively modulating the excitation force. Effective Q-factors as high as over one thousand have been demonstrated in practice. However, the active Q-control does not fundamentally change the damping intrinsically experienced by the oscillating AFM probe in liquid; adversely, the active Q-control amplifies the thermal noise and thus the random thermal fluctuation force experienced by the AFM cantilever, reducing its signal to noise ratio performance[15,30]. To compensate for the noise increase in imaging, the oscillation amplitude of the cantilever must be increased, which, however, increases the imaging tapping force, and thus negates the original benefit of having an actively boosted Q. It is thus desirable to have a dynamic AFM cantilever system that can achieve an intrinsic high Q-factor to provide sufficiently minimized imaging force and high signal to noise ratio for high resolution imaging. A dynamic system with an intrinsically high Q-factor can then more sensitively differentiate the energy dissipations contributed specifically by the tip-sample interactions without the overwhelming influence of the hydrodynamic contributions, and thus provide high resolution dynamic mapping of material properties in the sample even in liquid.

The overall damping experienced by an AFM cantilever system can be simply minimized by reducing its interaction cross-section with the fluid environment. To realize this while maintaining the general flexibility of an AFM system for imaging biological samples in liquid, we schemed a new AFM cantilever system where a sufficiently long nanoneedle was attached onto the distal end of a normal AFM cantilever and served as the AFM tip. When used for imaging biological samples cultured in a shallow liquid medium, the long nanoneedle allows the bulk AFM cantilever to be kept out of the liquid medium (see FIG. 1), completely eliminating the hydrodynamic damping experienced by the AFM cantilever in the traditional practice. In the following analyses and experimental studies, we show that such an AFM cantilever system maintains the harmonic dynamic response of the cantilever in air and acquires a high intrinsic Q-factor of ~100 in liquid without active Q-control, thus significantly reducing the minimal imaging tapping force while improving the signal to noise ratio performance of the dynamic AFM system. We further demonstrate its use (in the so called "trolling mode" AFM) for imaging, with minimal disturbance, individual collagen fibrils in liquid and the extremely delicate membranes of living HeLa cancer cells under physiological conditions.

Referring to FIG. 1, a high resolution atomic force microscope system comprises an atomic force microscope 40, including an atomic force microscope probe 50 having a cantilever beam 60 with a distal end 70. A nanoneedle probe 80 has a first end 90 that is bonded to the cantilever distal end 70. The nanoneedle probe 80 has a second end 100 or "free end" that is a tapered probe tip 100 used to interact and image a material 20 submersed in liquid 30. A longitudinally-extending axis corresponds to the direction formed from the axis that extends between nanoneedle first end 90 and second end 100. In an aspect, this axis is substantially perpendicular to a surface 110 of the cantilever beam distal end 70 (see, e.g., FIG. 2A). Nanoneedle length 105 is defined as the distance between the ends 90 and 100. The material 20 to be imaged is supported by a bottom surface 210 of container 200. In an aspect, the bottom surface is specially shaped to provide a spatially varying immersion depth 230, defined as the distance between the air-liquid interface and the bottom surface 210. For simplicity, the container of FIG. 1, does not have a spatially-varying immersion depth, although there can be slight variations in an immersion depth 230 due to variations in material height, depending on the material. For example, biological cells cultured on a substrate surface vary in height, with regions over the nucleus tending to be higher than edge regions. An artificial material, in contrast, such as a polymer, may be more uniform in height.

Figure 9A:
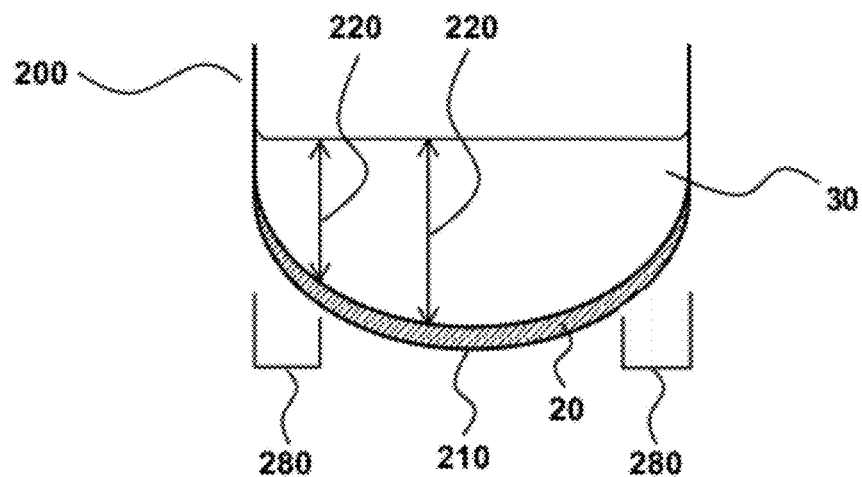
FIG. 9. Schematic illustration of different containers for facilitating imaging with immersed nanoneedle and cantilever beam that remains entirely in air. (A) and (B) are two examples of a concave substrate. (C) illustrates a microchannel in the bottom surface of the container.
Figure 9B:
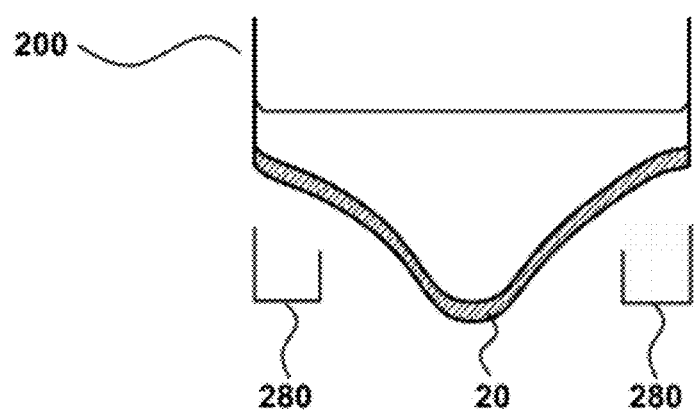
Figure 9C:
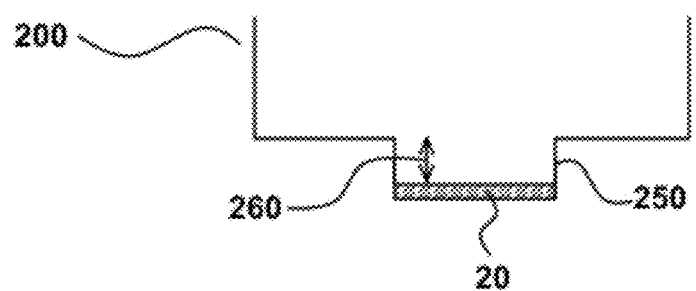

In contrast, FIG. 9, provides various examples of a container 200 having a bottom that is shaped to provide a spatially varying immersion depth 220 due to the shaped substrate bottom surface 210 upon which material 20 is supported. FIGS. 9A and 9B are examples of a bottom surface shape that is curved so as to provide a liquid-covered region 280 adjacent to the container wall for imaging, wherein region 280 is less than or equal to the nanoneedle length. In an aspect, the shape is generally concave, with respect to the liquid supported by the substrate, so that regions near the wall are shallower than central regions. This aspect can be beneficial in that sufficient liquid may be maintained over material 20, thereby avoiding concern related to exposure of material 20 to air or unwanted changes in the composition of liquid 30 (e.g., liquid evaporation, transfer of substances between liquid and material/container wall). A specially shaped container bottom surface can be particularly useful when imaging live biological cells, where it is important that appropriate liquid such as culture media is maintained over the cells, including a cell culture. FIG. 9C is another example of a shaped bottom surface, with the shape related to a microchannel 250 having a depth 260. In that example, the material may be provided in microchannel 260 and liquid provided to ensure the microchannel is filled, so long as the microchannel depth 260 is less than or equal to the nanoneedle length. This configuration provides a relatively simple manner for precisely controlling the immersion depth. For example, a container having these microchannels may be over-filled, and excess liquid subsequently removed by aspiration or draining from those regions outside the microchannel, so that only liquid remains in the microchannel. In an aspect, a plurality of microchannels is provided in the container bottom.

Figure 10A:
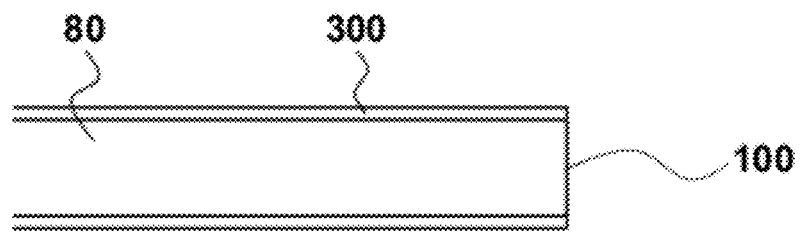
FIG. 10: Illustrations of a nanoneedle partially coated with an electrically insulating thin film. The different exemplified embodiments include: 10A The sides of the nanoneedle are coated and the end cross-section of the tip end is not coated; 10B and 10C An uncoated length, L, with the insulating thin film thickness varying or constant, respectively.
Figure 10B:
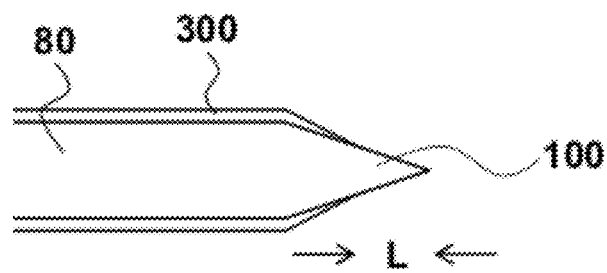
Figure 10C:
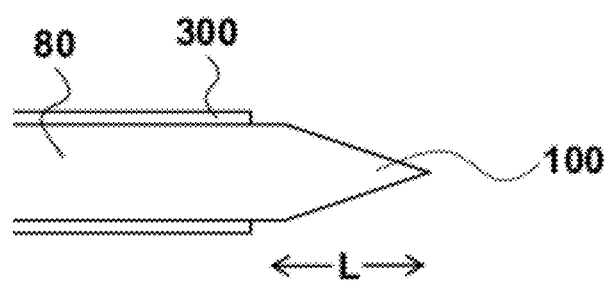

FIG. 10 provides examples of different AFM probes for performing conductivity and/or electrochemical studies of material surfaces. An electrically insulating thin film 300 covers a portion of the nanoneedle 80 surface, with at least a portion of the nanoneedle tip end 100 that is not covered. FIG. 10A illustrates that only the end of the tip end 100 is not covered (e.g., the tip sides are covered). FIGS. 10B and 10C illustrate that at least a portion of the tip end sides are not covered. Optionally, the electrically insulating thin film 300 has a thickness that can taper toward the free end (FIG. 10B) or that is constant (FIG. 10C). The uncoated length (see L of FIGS. 10B and 10C) is selected as desired. In an aspect, $0 \leq L \leq 500$ nm. In an aspect, $50$ nm $\leq L \leq 500$ nm. In an aspect $L=0$, and only the end surface that is generally perpendicular to the nanoneedle longitudinal axis is not coated.

We first compare the damping dissipation experienced by the nanoneedle AFM cantilever system with that of a regular AFM probe when operated in traditional tapping mode in water (the detailed analysis is included below) (FIG. 1, top panel). The damping of an AFM cantilever operated in liquid originates mainly from the hydrodynamic interaction between the cantilever and the liquid. In addition, the liquid dragged along by the cantilever increases its effective mass. For a typical commercial Si AFM probe (~300 μm in length, ~35 μm in width and ~2 μm in thickness, k ~6 N/m and a Q-factor of ~450 in air), the mass $m_c$ of the probe is $\sim 2\times 10^{-12}$ g, the added mass $m_a$ in its dynamic oscillation in water is $\sim 1.7 \times 10^{-10}$ g, and the damping coefficient $c_L$ due to the hydrodynamic interaction is $\sim 8\times 10^{-6}$ Ns/m. The Q-factor of such an AFM probe dynamically operated in water is merely ~4, dropped more than two orders of magnitude from its value in air. For the nanoneedle cantilever system operated in the "trolling mode" in water as shown in (FIG. 1, bottom panel), the contributions to its damping originate mainly from the Stokes drag force on the portion of the nanoneedle immersed in the liquid ($c_d$ and the nanoscale meniscus formed at the nanoneedle/liquid interface due to the large velocity gradient across the thin meniscus layer ($c_m$). The Stokes drag $c_d$ is length dependent and is calculated to be $\sim 25\times 10^{-9}$ Ns/m for a needle having an immersed length of 10 μm and a diameter of 600 nm. The damping coefficient $c_m$ due to the nanoscale meniscus is $\sim 23\times 10^{-9}$ Ns/m for the same needle assuming a dynamic contact angle of $\theta_d=\pi/4$ between water and the nanoneedle. Therefore, the overall damping is $\sim 5\times 10^{-8}$ Ns/m, which is almost two orders of magnitude smaller than that experienced by an AFM cantilever immersed in water operated in the traditional tapping mode. The intrinsic Q-factor of this nanoneedle cantilever system operated in the "trolling mode" is calculated to be over 70 according to Eq. 1, much higher than that operated in the traditional tapping mode.

More significantly, due to the much reduced hydrodynamic interaction cross-section in this "trolling mode", the thermal fluctuation force $\langle F_T \rangle$, which contributes to the AFM imaging noise, is significantly reduced. $\langle F_T \rangle$ is related to the damping coefficient c by $\langle F_T \rangle = \sqrt{4k_B Tc}$, where $k_B$ is the Boltzmann constant and T is the system temperature. The significantly reduced damping coefficient of the nanoneedle cantilever system, consequently, reduces the thermal noise, by an order of magnitude according to the previous parameters. If we define a parameter $S=Q/\sqrt{r}$ to qualify the quality of the signal that can be acquired by an AFM cantilever system, this value in the nanoneedle cantilever system operated in the "trolling mode" is over 200 times of that available in the traditional method according to the values of Q and c obtained previously. Furthermore, due to the small interaction cross-section with the surrounding liquid, the nanoneedle cantilever system introduces minimal mechanical disturbance to the liquid and ultimately to the sample. In addition, as the AFM cantilever is entirely kept out the liquid environment, the laser path for sensing the deflection of the cantilever is not affected, whereas in the regular mode the laser diffracts at the liquid-air interface, resulting sum signal loss at the photo-detector.

We fabricate the nanoneedle AFM probes with the meniscus-confined electrodeposition technique recently developed in our group[31,32] (see also, U.S. Pub. No. 20090000364; U.S. Pat. App. No. 61/352,590 filed Jun. 8, 2010, each of which are hereby specifically incorporated by reference). Metallic nanoneedles with desired diameters and lengths are directly deposited onto commercial tapping mode AFM cantilevers having a nominal force constant of ~6 N/m. In this study, we deposit Pt nanoneedles having an aspect ratio of ~100, a length of ~60 μm and a diameter of ~600 nm near the distal end of AFM cantilevers (FIG. 2A). The nanoneedles are grown with an inclination of ~12° off the vertical direction of the cantilever surface so to compensate for the mounting angle of the AFM probes and to realize their vertical entrance into the liquid sample surface in the AFM imaging process. In an aspect, the longitudinally-extending axis relative to the cantilever beam distal end surface is selected so that the nanoneedle enters the liquid in a perpendicular orientation, such as within 80°, within 85°, or about 90° relative to the liquid/air interface surface. The tip of the nanoneedle is then sharpened with focused ion beam milling to attain a tip radius curvature as desired, such as a curvature of 15-25 nm (FIG. 2A, inset). The buckling force of such a Pt nanoneedle (taking the elastic constant of Pt to be 168 GPa) is estimated to be ~700 nN, significantly above the force needed for AFM imaging, and the natural frequency of the nanoneedle is ~1.3 MHz, much higher than the operating frequency in AFM imaging, ~200 kHz. We use a concave glass container to hold the liquid medium for preparing the biological samples and culturing cells. A concave liquid container provides sufficient sample areas around the wet perimeter with sufficiently shallow liquid level (<60 µm, the length of the nanoneedle) to keep the AFM cantilever out of the liquid surface to perform the "trolling mode", while in the meantime provided the necessary liquid environment for preserving living cells and biological samples (FIG. 3). The sample and the AFM cantilever system are enclosed in a humidity chamber[33] under a 100% relative humidity to limit water evaporation from the shallow liquid areas and maintain a stable interface between liquid and nanoneedle. All experiments are performed using the Veeco Dimension 3100 AFM system with a Nanoscope IV controller.

Figure 2D:
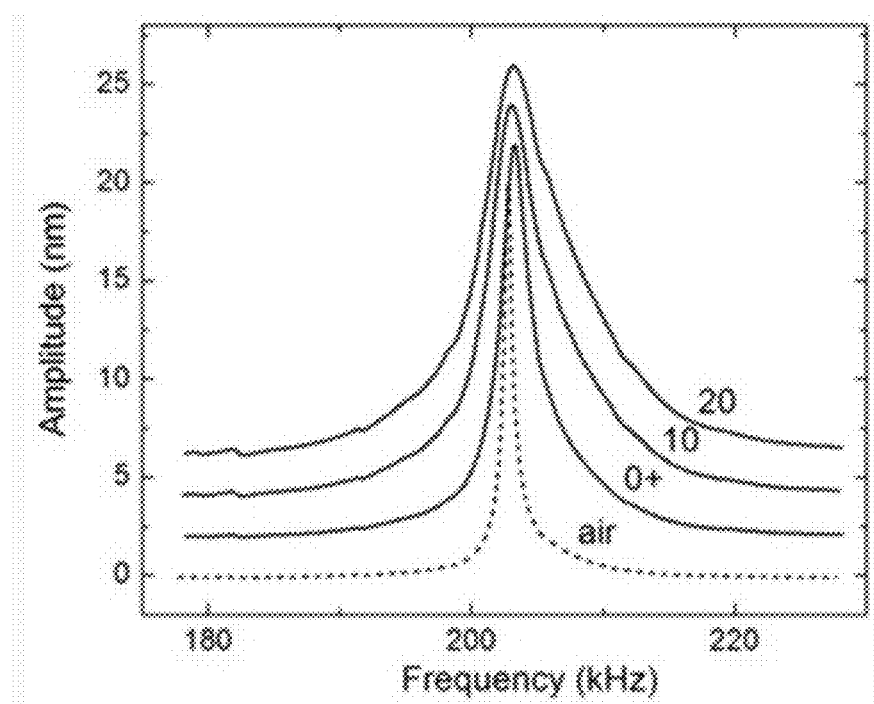
FIG. 2. Characteristics of the nanoneedle cantilever system. (A) SEM imaging showing a ~60 μm long and ~600 nm-diameter Pt nanoneedle directly deposited onto the AFM cantilever with the meniscus-confined electrodeposition technique. The inset shows the end of the nanoneedle sharpened down to ~25 nm in tip radius of curvature with focused ion beam milling. (B) Static approach and retraction curves of the nanoneedle into water and ethylene glycol showing the change of the cantilever oscillation amplitudes and the measured surface tension forces from the cantilever deflection. (C) Acquired resonance curves of the AFM cantilever at different immersion lengths of the nanoneedle. Subsequent curves are offset upwards by 2 nm in amplitude to better present the data. Actual resonance curves have the same peak amplitude. (D) Dependence of the measured quality factor Q as a function of the immersion length of the nanoneedle (E). The quality factor of the cantilever system in air is ~450.
Figure 2E:
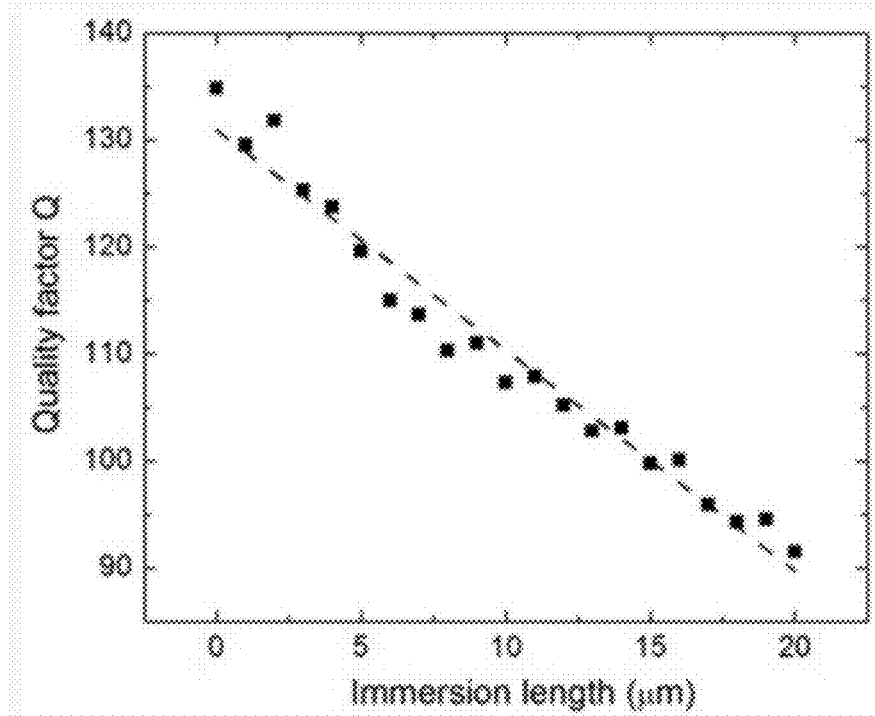
Figure 3A:
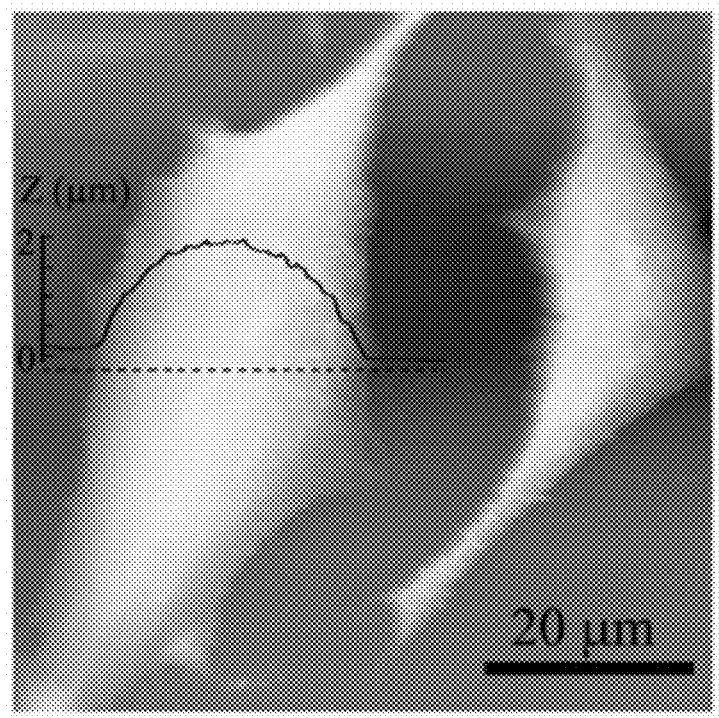
FIG. 3. "Trolling mode" AFM imaging of the membrane of living HeLa cells in physiological conditions. (A) Topography image of two neighboring cells and the corresponding height profile acquired along the dashed line marked on the cell overlaid on the image. (B) The corresponding 3-D representation of the topographic map of the cells in (A). (C) The corresponding amplitude image, and (D) the corresponding phase image of the cells.
Figure 3B:
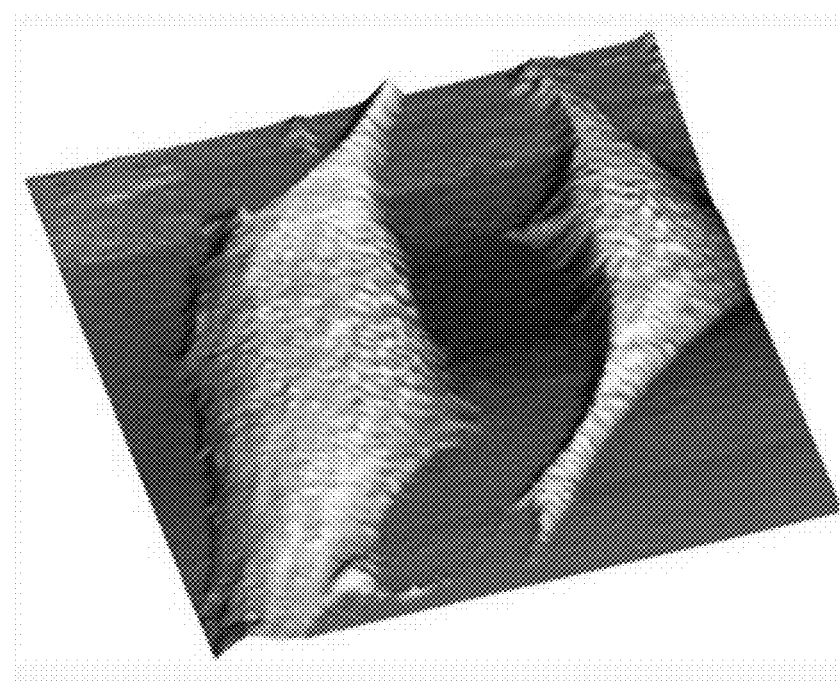
Figure 3C:
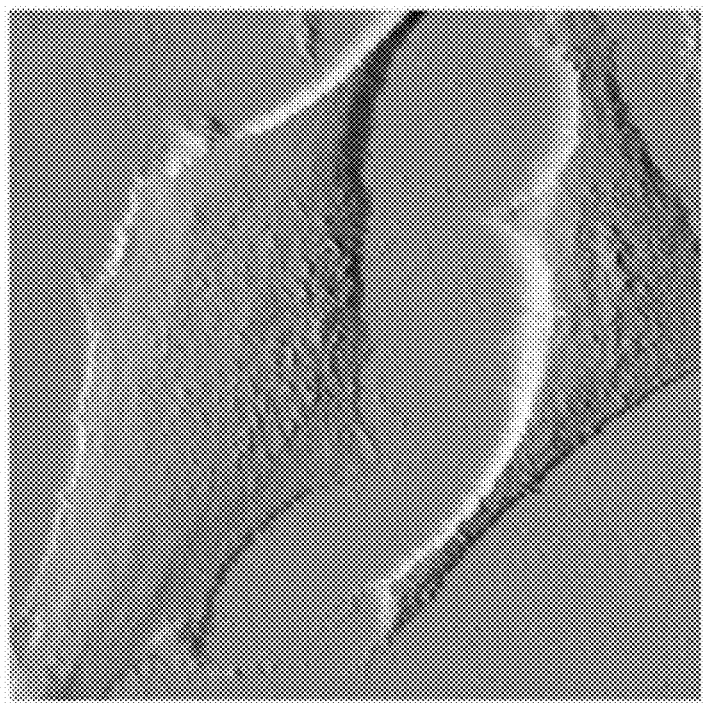
Figure 3D:
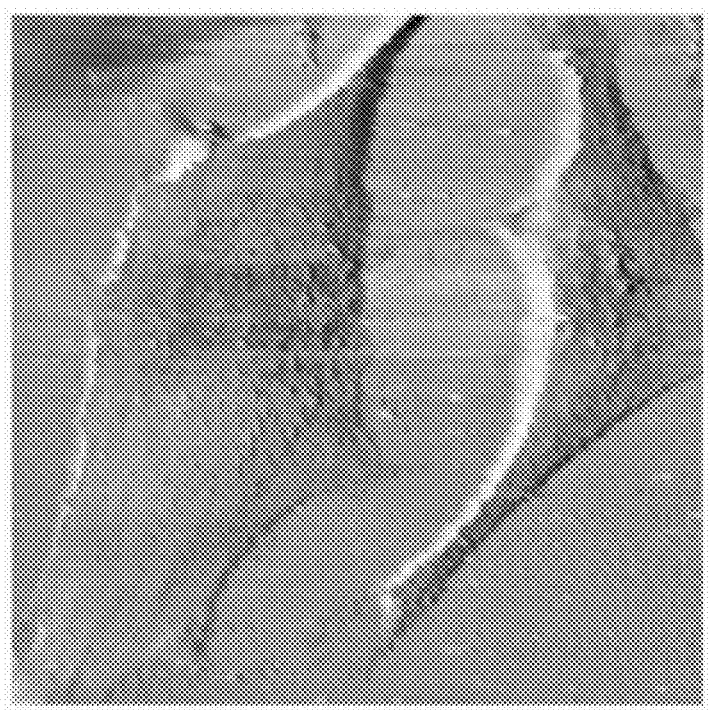

The performance characteristics of the nanoneedle cantilever system operated in the "trolling mode" is studied separately in de-ionized water, phosphate buffered saline (PBS), and ethylene glycol (a non-volatile liquid at room temperature) environments. FIGS. 2B-2C show the typical snap-in and snap-back behaviors and the corresponding changes in the deflection (force) and the oscillation amplitude of the cantilever as the nanoneedle advances into and retracts out of the air/liquid interface. The force due to surface tension measured at the points of snap-back in the curves are ~120 nN in water, and ~87 nN in ethylene glycol, which are in good agreement with the surface tension force estimations according to $F=\pi\gamma d$ by using a nominal nanoneedle diameter d of 600 nm and the surface energy values $\gamma$ for water (~72 mJ/m$^2$) and ethylene glycol (~47 mJ/m$^2$). The estimated force of surface tension of the nanoneedle in water and ethylene glycol are ~135 nN and ~90 nN, respectively. This verified the vertical entrance of the nanoneedle into the liquid interface, optimal for operating the "trolling mode" AFM. We next characterize the dependence of the Q-factor of the nanoneedle cantilever system on the immersed nanoneedle length. The nanoneedle is dipped into liquid in steps of 1 µm and each time the dynamic response curve is recorded. Shown in FIG. 2D is the dynamic response of the cantilever in air along with the corresponding curves acquired for different lengths of the nanoneedle in liquid. The harmonic behavior of the cantilever is nearly perfectly preserved without the appearance of any spurious peaks in liquid (in the traditional tapping mode AFM in liquid, the common existence of spurious peaks even renders the selection of the actual resonance peak of the cantilever difficult). In addition, there is no significant shift in the resonance frequency of the cantilever, indicating the minimal effect of the added mass onto the nanoneedle as expected. Moreover, the Q-factor of the oscillation is significantly higher than that in regular tapping mode AFM imaging in liquid. The Q-factor is obtained from each curve by fitting the resonance curve with a Lorentzian function of a single harmonic oscillator. The length-dependent Q-factor is plotted in FIG. 2E. For a cantilever with a Q-factor of ~450 in air, the Q-factor dropped to one third (~135) of that at the moment the nanoneedle entered the liquid surface and then almost linearly reduced to 90, one fifth of the Q-factor in air, when it was dipped into the liquid by ~20 µm.

EXAMPLE 2

Imaging Materials. The "trolling mode" AFM microscopy is implemented for imaging biological samples in liquid. We prepare the biological samples (collagen fibrils and living HeLa cells) in concave glass containers as mentioned above. We first advance the nanoneedle towards the liquid surface near the wet perimeter while monitoring the amplitude and deflection of the AFM cantilever continuously. The reach of the liquid surface is identified by observing the snap-in motion of the cantilever in which the oscillation amplitude of the cantilever dropped noticeably. We then perform a new tuning procedure with the nanoneedle partially immersed in liquid to precisely determine the new resonance frequency of the nanoneedle cantilever system. To engage onto the sample surface immersed underneath a shallow liquid layer, we rely on identifying the transition in the change of the oscillation amplitude versus the distance dependence. The change in oscillation amplitude is more abrupt when the tip of the nanoneedle begins to sense the presence of the sample surface compared to that due to solely the hydrodynamic drag on the nanoneedle. Once the sample surface is engaged, the drive amplitude and the set-point in the AFM system are adjusted to optimize the imaging quality as in regular AFM imaging practices.

Shown in FIG. 6 is the "trolling mode" topography images of individual collagen fibrils (bovine Achilles tendon, Sigma-Aldrich) immersed in ethylene glycol. FIGS. 6A and 6B are acquired with a drive amplitude at 10 nm a set point at 80%. Non-disturbed images of the fibrils are clearly resolved. The fibrils in the image have diameters from 50 nm to 200 nm. More strikingly, when the drive amplitude is reduced to 1 nm, no obvious change is noticed in the quality of the acquired image as shown in FIGS. 6C and 6D, manifesting the sufficient reserve in signal to noise ratio available in this operating mode. The average tapping force $<F_{ts}>$ applied on the sample in tapping mode is estimated based on $$<F_{ts}> = \frac{k}{Q}[A_0^2 - A_{sp}^2]^{1/2} \quad (15),$$

where k is the spring constant of the cantilever, and $A_o$ and $A_{sp}$ are the free and set-point amplitudes of the cantilever, respectively. The 1 nm free oscillation amplitude used in imaging corresponded to an estimated average tapping force of less than 60 pN (for Q ~100 in liquid and a k of 6 N/m). This tapping force could be further reduced by using an AFM cantilever with a smaller force constant (regular tapping mode imaging in liquid typically uses an AFM probe having a force constant of ~0.5 N/m).

Figure 4A:
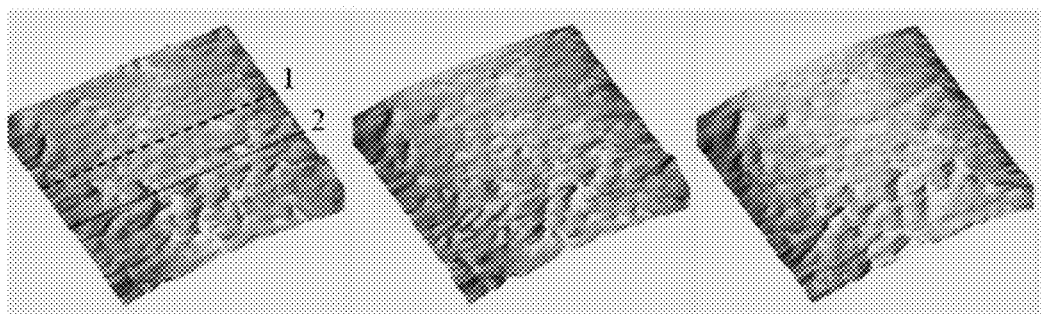
FIG. 4. "Trolling mode" AFM imaging of dynamic membrane structures. (A) Three consecutive 10 μm×10 μm AFM topography images acquired on the cell membrane with the "Trolling mode" AFM on a living HeLa cell in physiological conditions, and the corresponding height profiles acquired along the dashed line (B) and the dotted line (C) marked in the image.
Figure 4B:
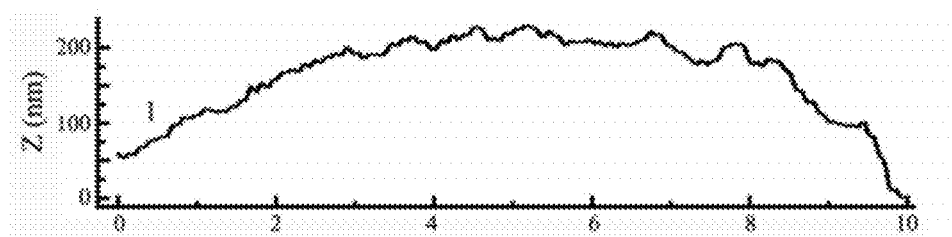
Figure 4C:
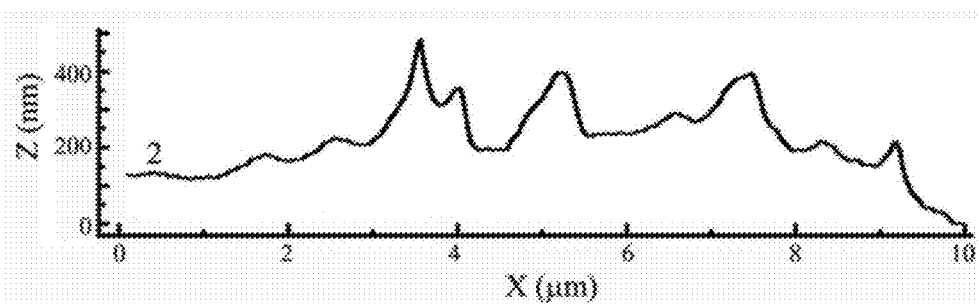
Figure 5A:
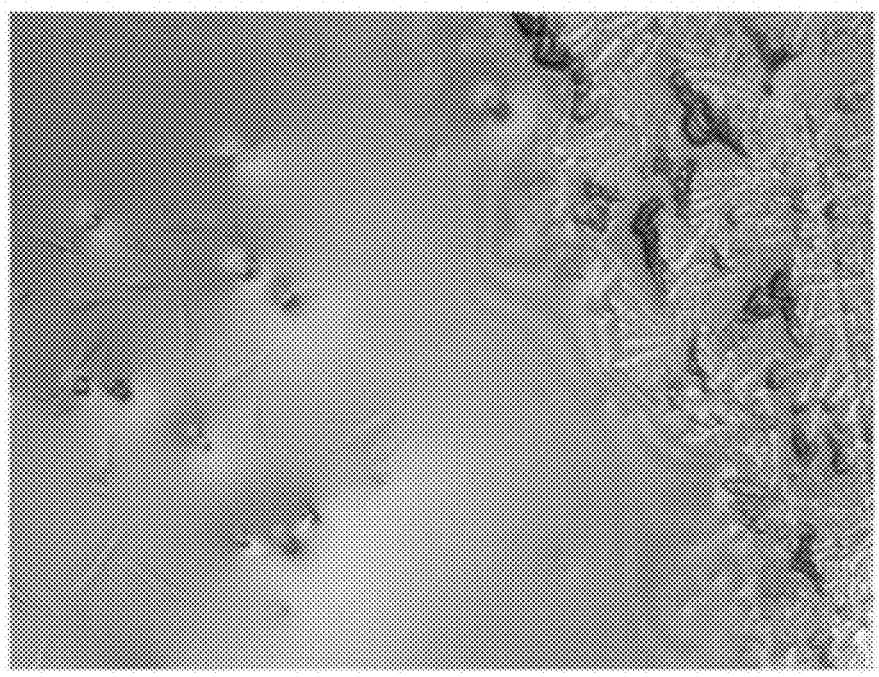
FIG. 5. Optical images showing the wet perimeter of the liquid medium in a concave glass container with cultured HeLa cells (A) and a selected region (B) near the wet perimeter for the "trolling mode" AFM operation. The dried area in (A) shows also the salt crystals precipitated from the PBS solution. The dark beam in (B) is the AFM cantilever above the liquid medium.
Figure 5B:
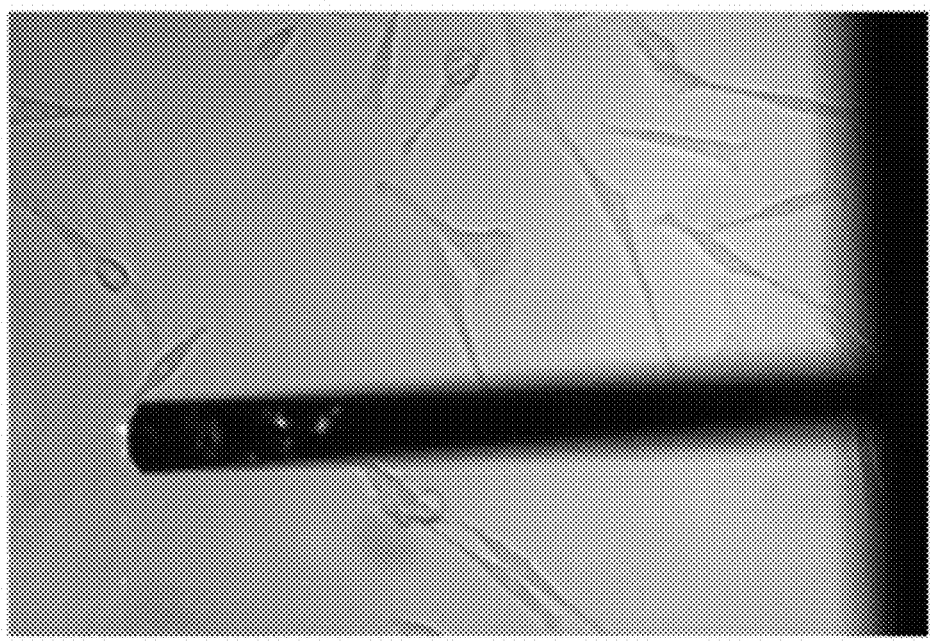
Figure 6A:
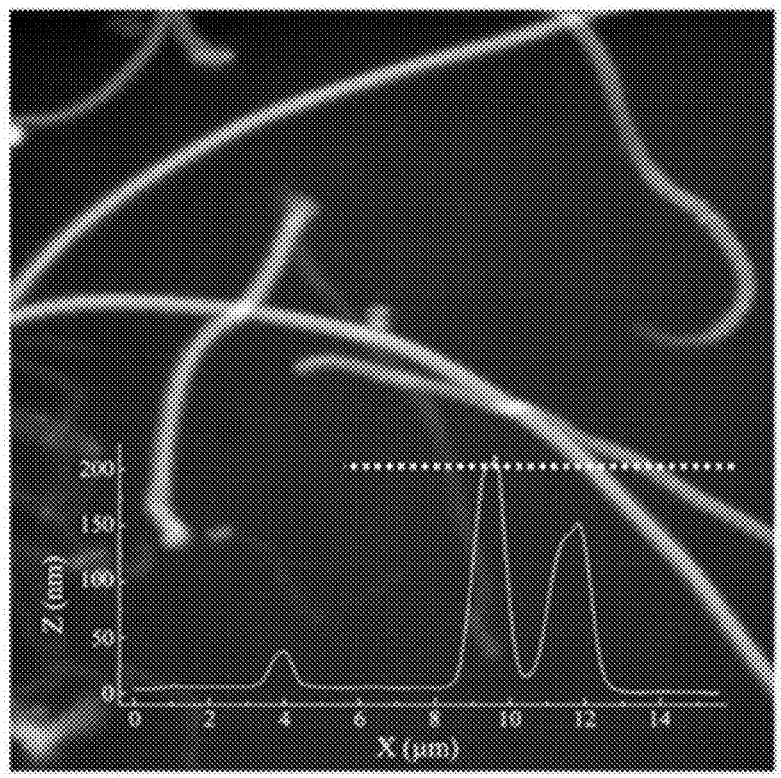
FIG. 6. AFM images of type I collagen fibrils acquired in ethylene glycol with the "trolling mode". Amplitude (A) and phase (B) images of collagen fibrils acquired in ethylene glycol. (A-B) 30 μm×30 μm AFM height (A) and phase (B) images of collagen fibrils in ethylene glycol acquired at a drive amplitude of 10 nm. Overlaid is the height plot acquired along the dotted line marked in (A). (C-D) AFM height (C) and phase (D) images of the same collagen fibrils in ethylene glycol acquired at a drive amplitude of 1 nm showing minimally noticeable change in image quality.
Figure 6B:
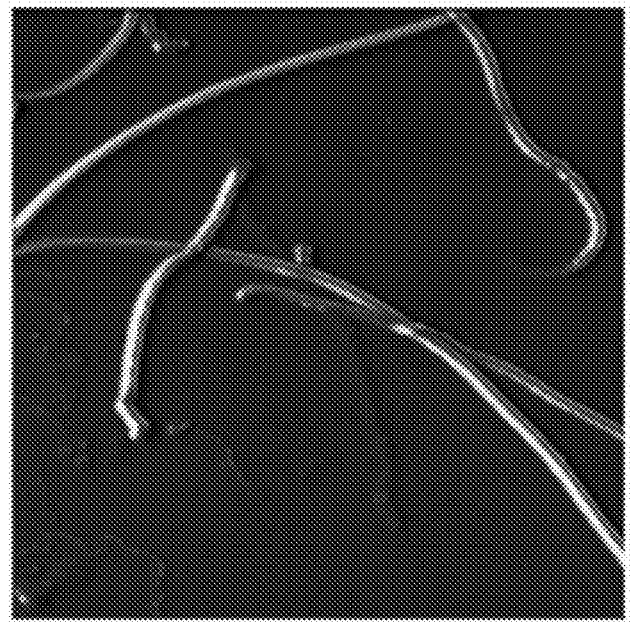
Figure 6C:
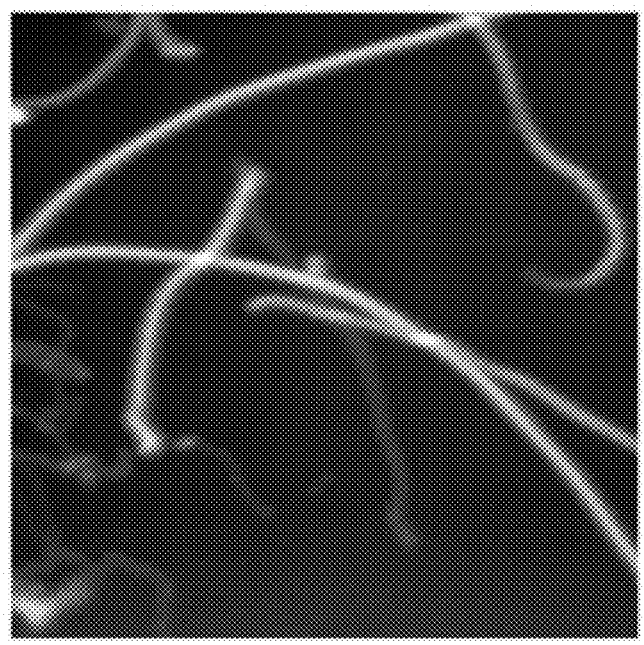
Figure 6D:
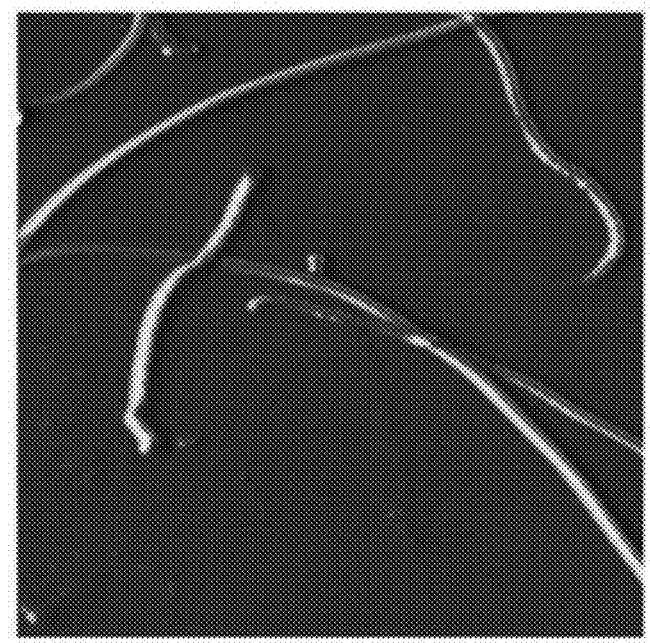
Figure 7A:
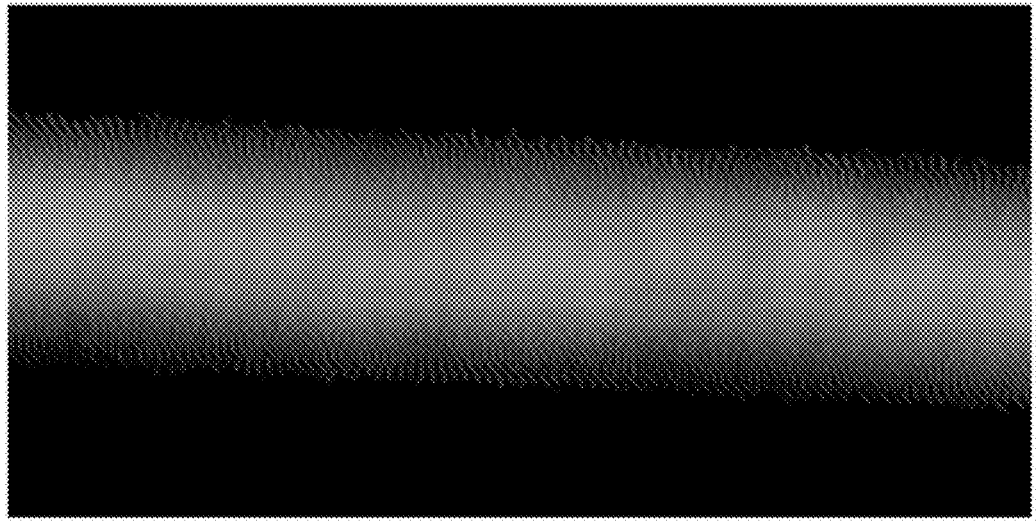
FIG. 7. Height (A) and phase (B) images of a collagen fibril segment (~96 nm in diameter, and ~2 μm in length) acquired in air with a nanoneedle AFM tip and the phase plot (C) plotted along the dotted line in (B). The characteristic banding pattern in period of ~60-70 nm in the collagen fibril[7,8] is clearly resolved. Such periodic banding pattern was not as clearly resolved in ethylene glycol. The noisy pattern along the edge of the collagen fibril in the images was due to the strong adhesion between the nanoneedle tip and the side surface of the collagen fibril during the imaging, especially when water condensation along the side surface of collagen fibril was present in an ambient air environment.
Figure 7B:
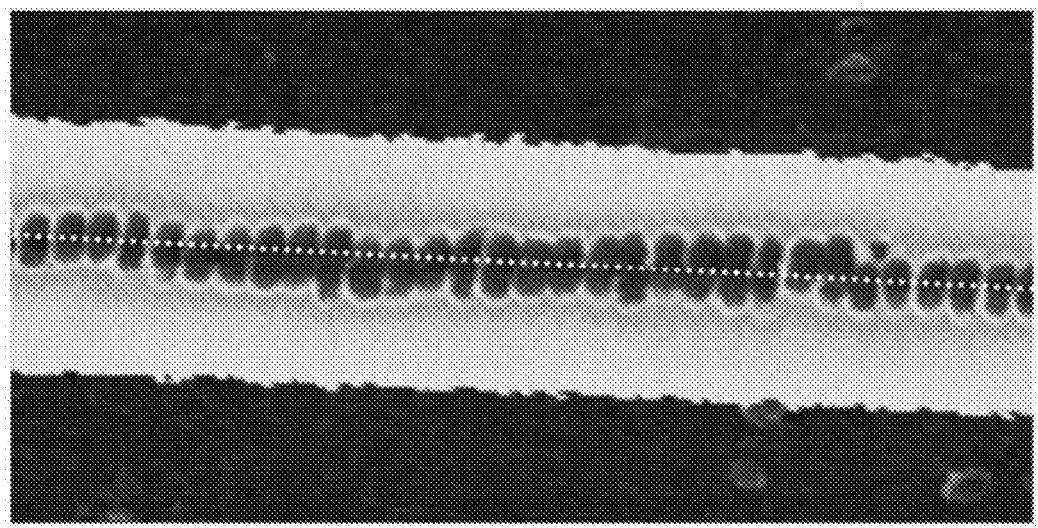
Figure 7C:
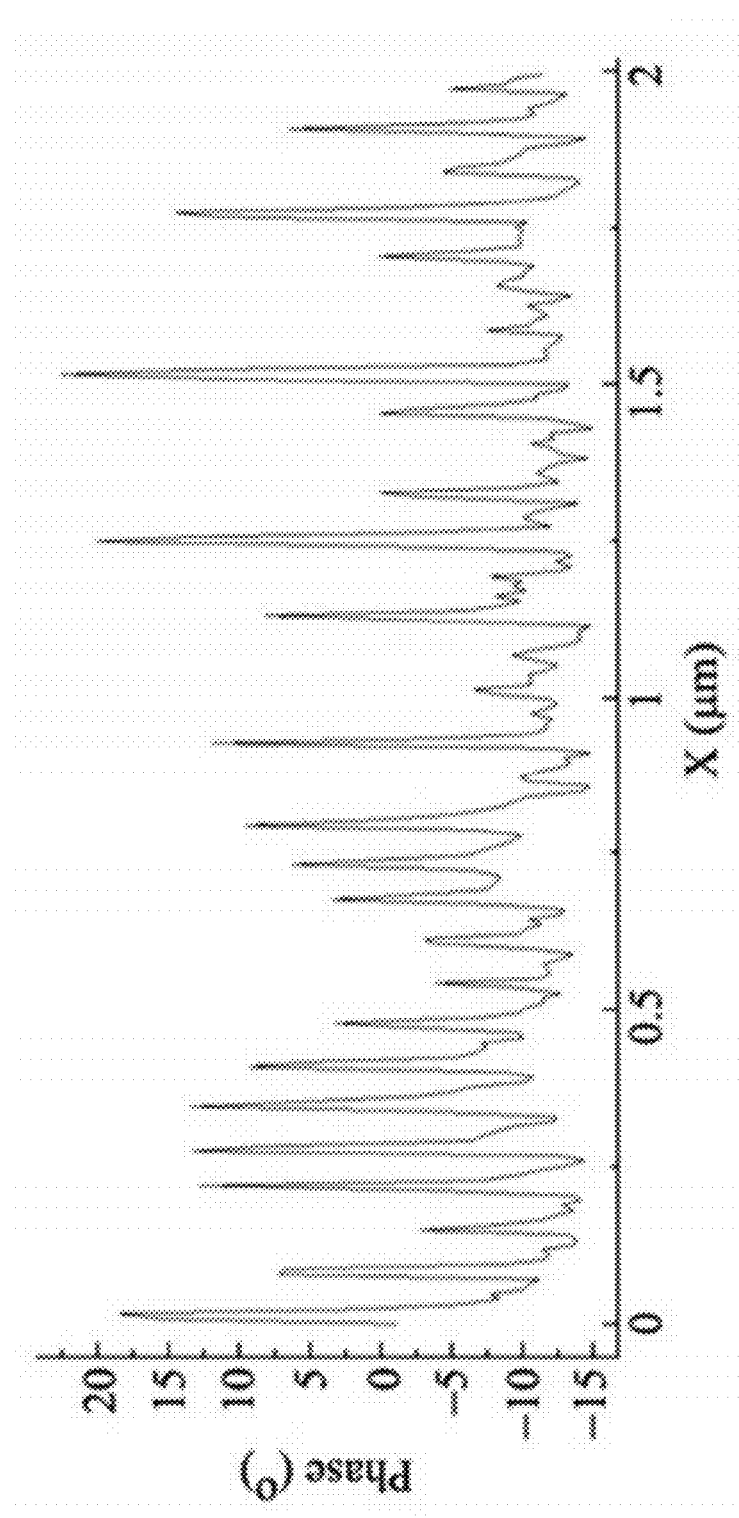
Figure 8A:
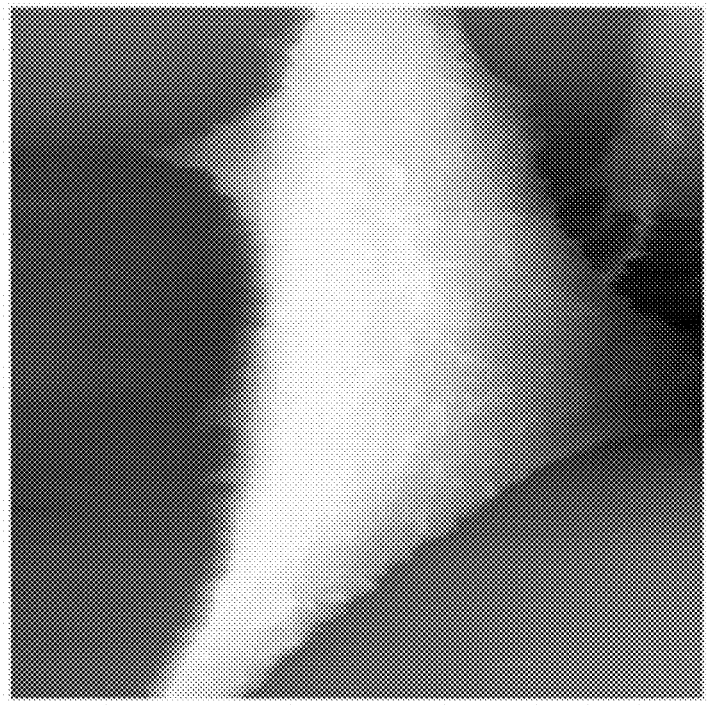
FIG. 8. "Trolling mode" AFM imaging of a living HeLa cell in physiological conditions. (A) 35 µm×35 µm topography image of the cell (also shown in FIG. 4) acquired at an increased tapping force. (B) The corresponding phase image of the cell. The cell nucleus is delineated with a dotted line. (C) 10 µm×10 µm topography image acquired over a small area on the cell membrane near the edge of the cell. (D) The corresponding phase image of (C).
Figure 8B:
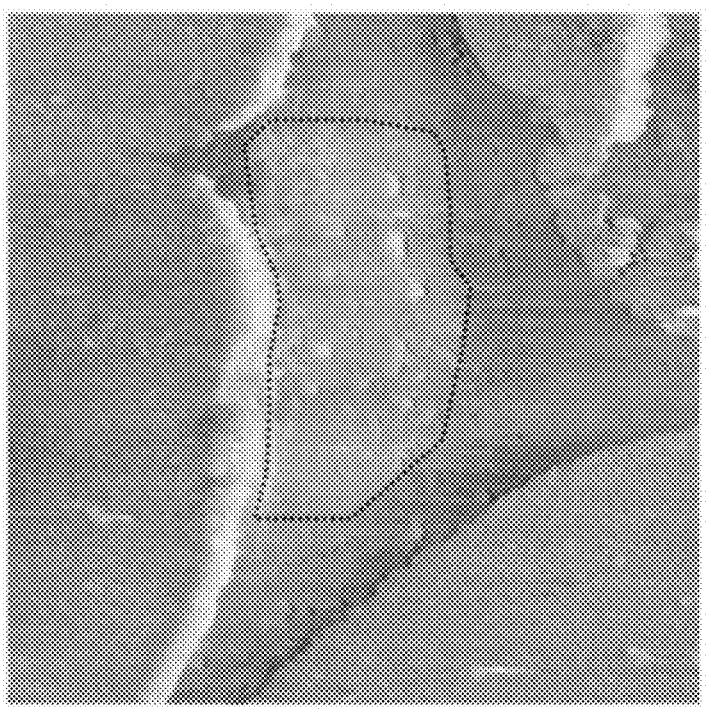
Figure 8C:
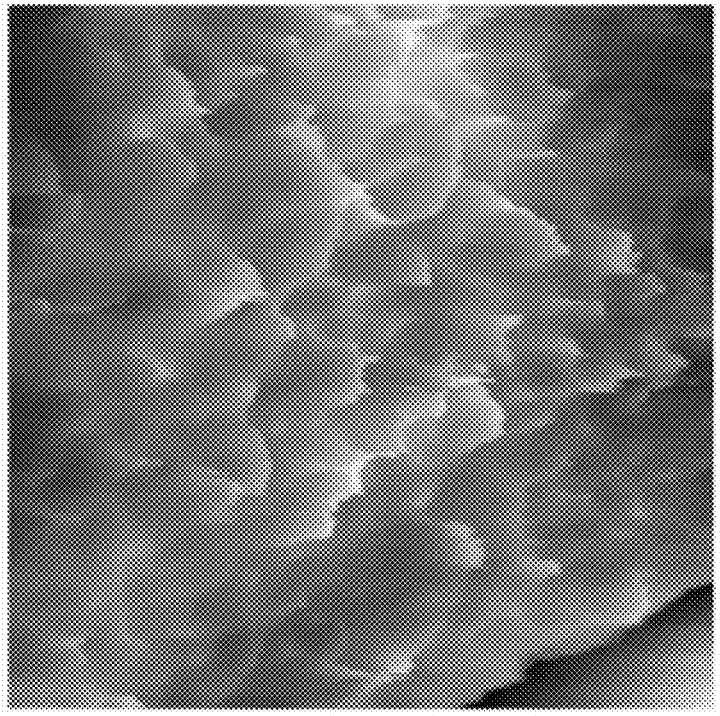
Figure 8D:
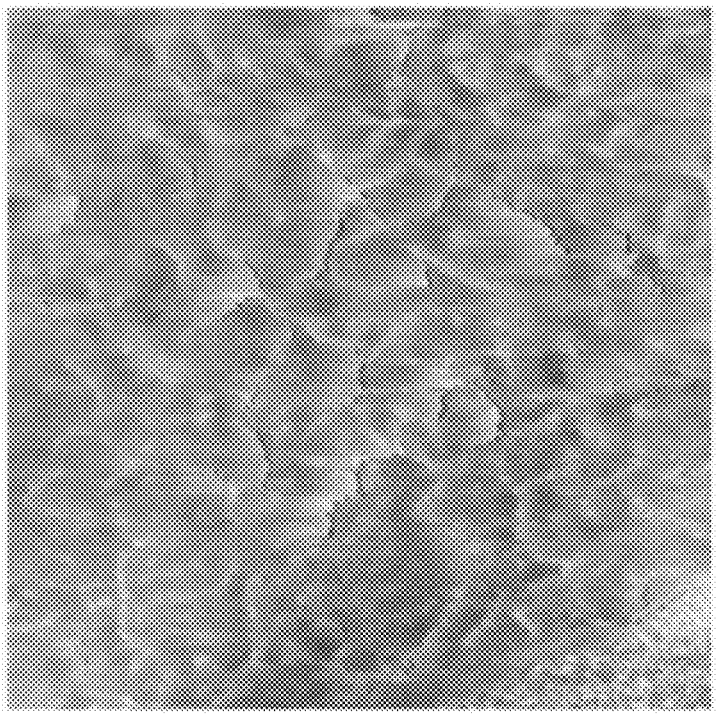

The topography and phase images of living HeLa cells in PBS are shown in FIG. 3. The images are acquired at a drive amplitude of below 20 nm, a set point of 80% and a scan rate of 1 Hz. The topography image of the cell is mapped following the natural membrane contour and shows no obvious deformation of the cell as evidenced by the lack of ostensible protrusions due to the presence of the cell nucleus and cytoskeleton structures. Both the amplitude and phase images more clearly showed this "flatness" in mechanical response and thus the minimal or no deformation of the cell membrane. In previous AFM imaging studies of cells in vivo with the traditional tapping mode, the cells were often severely deformed by the tapping force from the AFM tip during the imaging process. Instead of mapping cell membrane surface and the actual cell volume, the traditional tapping mode AFM profiled the intracellular mechanical differences and revealed the intracellular actin filaments and microtubule networks as well as subcellular organelles including the nucleus. The "trolling mode" AFM can thus reveal topographical features actually present on the membrane surface. FIG. 4 shows three consecutive image scans over the same area on the membrane surface. The topographic images, besides showing the reproducible presence of some microscale features (protrusions having a height of over ~50 nm above the membrane in the images, presumably membrane proteins, or lipid domains) and their partially confined presence in their preferred regions on the membrane surface, showed also the dynamic or mobile nature of some other surface features evidenced by their relative displacements from their original locations in those consecutively acquired images.

The membrane of a living cell, especially the cancerous type HeLa cell, is recognized to be extremely soft, having an effective elastic modulus in the 1 kPa range. Previous studies have found that thermally driven characteristic fluctuations with an amplitude as large as several tens of nanometer can exist in the cell membrane of certain living cells[34,35], which sets a physical limit on the attainable imaging resolution on the membrane of a living cell with AFM. Indeed, as revealed in the height profile in FIG. 4B, small fluctuations having magnitudes of around tens of nanometers did persistently overlap on the height profile of the cell membrane, and only those protrusions with relatively significant heights (over ~50 nm) are clearly revealed. Such protrusions could also be the result of them being more mechanically rigid than the surrounding lipid membrane, as in "trolling mode" AFM, while the effective tapping force was very small, it was nevertheless finite. The acquired AFM images of the cell membrane, thus, unavoidably reveal also the mechanical structures of membrane constituents and membrane proximate cytoskeleton structures. FIG. 8 shows both the topography image and the phase image of the cell (the same cell on the right side in FIG. 3) imaged under a slightly increased tapping force. As more clearly seen from the phase image of the cell, the contour of the cell nucleus began to emerge, reflecting its relatively higher stiffness than that of the surrounding structures. More features also begin to appear on the membrane surface, as seen in the topography and phase images acquired at smaller scan size, indicating the highly non-uniform mechanical heterogeneity of cell membrane and the existence of near membrane structures. It is known that the phase image in tapping mode AFM is most sensitive to viscoelastic mechanical properties of sample surfaces[13,20].

The demonstrated "trolling mode" operation for AFM in liquid introduced herein offers several fundamental advantages that are not available in the regular tapping mode AFM in liquid. The "trolling mode" preserves the harmonic dynamic response of the cantilever and has an intrinsic high quality factor in liquid without the need of active Q-control. It is inherently "quiet" in operation due to the small interaction cross-section with the surrounding liquid and introduces minimal mechanical disturbance to the surrounding fluid and the sample. These combination results in inherently high signal to noise ratio performance of the system for acquiring high resolution AFM images and high sensitivity to damping associated with tip-sample interactions in liquid environments. The "trolling mode" AFM, nevertheless, is still inherently a dynamic imaging method. It is thus expected that many applications of dynamic mode AFM for acquiring elastic, viscoelastic, and other material properties can be readily translated into this new mode of operation in liquid, especially for studying very soft biological tissue and cellular samples. In addition, the method is readily adaptable in existing commercial AFM systems without the need for extra accessories.

REFERENCES

1. F. J. Giessibl, *Rev. Mod. Phys.* 75, 949 (2003).
2. C. A. Mirkin, *ACS Nano* 1, 79 (2007).
3. P. K. Hansma, B. Drake, O. Marti, S. A. Gould, C. B. Prater, *Science* 243, 641 (1989).
4. M. Radmacher, R. W. Tillamnn, M. Fritz, H. E. Gaub, *Science* 257, 1900 (1992).
5. Y. E. Korchev, C. L. Bashford, M. Milovanovic, I. Vodyanoy, M. J. Lab, *Biophys. J.* 73, 653 (1997).
6. Y. E. Korchev, Y. A. Negulyaev, C. R. W. Edwards, I. Vodyanoy, M. J. Lab, *Nature Cell Bio.* 2, 616 (2000).
7. J. Tamayo, A. D. L. Humphris, M. J. Miles, *Appl. Phys. Lett.* 77, 582 (2000).
8. A. I. Shevchuk et al., *Angew. Chem.* 45, 2212 (2006).
9. J. Preiner, J. Tang, V. Pastushenko, P. Hinterdorfer, *Phys. Rev. Lett.* 99, 046102 (2007).
10. T. Fukuma, S. P. Jarvis, in *Noncontact Atomic Force Microscopy* S. Morita, F. J. Giessibl, R. Wiesendanger, Eds. (Springer, Berlin, 2009), vol. 2, pp. 329-345.
11. G. Andre et al., *Nature Commu.* 1, 1 (2010).
12. E. Henderson, P. G. Haydon, D. S. Sakaguchi, *Science* 257, 1944 (1992).
13. R. Garcia, R. Magerle, R. Perez, *Nature Mater.* 6, 405 (2007).
14. Y. G. Kuznetsov, A. J. Malkin, A. McPherson, *J. Struct. Biol.* 120, 180 (1997).
15. P. D. Ashby, *Appl. Phys. Lett.* 91, 254102 (2007).
16. K. Jacobson, O. G. Mouritsen, R. G. W. Anderson, *Nature Cell Bio.* 9, 7 (2007).
17. G. van Meer, D. R. Voelker, G. W. Feigenson, *Nature Reviews Molecular Cell Biology* 9, 112 (2008).
18. P. K. Hansma et al., *Appl. Phys. Lett.* 64, 1738 (1994).
19. C. A. J. Putman, K. O. Van der Werf, B. G. De Grooth, N. F. Van Hulst, J. Greve, *Appl. Phys. Lett.* 64, 2454 (1994).
20. R. Garcia, R. Perez, *Surface Science Reports* 47, 197 (2002).
21. T. Fukuma, K. Kobayashi, K. Matsushige, H. Yamada, *Appl. Phys. Lett.* 87, 034101 (2005).
22. J. E. Sader, *J. Appl. Phys.* 84, 64 (1998).
23. A. Maali et al., *J. Appl. Phys.* 97, 074907 (2005).
24. E. T. Herruzo, R. Garcia, *Appl. Phys. Lett.* 91, 143113 (2007).
25. X. Xu, A. Raman, *J. Appl. Phys.* 102, 034303 (2007).
26. A. D. L. Humphris, J. Tamayo, M. J. Miles, *Langmuir* 16, 7891 (2000).
27. J. Tamayo, A. D. L. Humphris, R. J. Owen, M. J. Miles, *Biophys. J.* 81, 526 (2001).
28. D. Ebeling, H. Hölscher, H. Fuchs, B. Anczykowski, U. D. Schwarz, *Nanotechnology* 17, S221 (2006).
29. T. R. Rodriguez, R. Garcia, *Appl. Phys. Lett.* 82, 1584790 (2003).
30. R. D. Jäggi, A. Franco-Obregón, P. Studerus, K. Ensslin, *Appl. Phys. Lett.* 79, 135 (2001).
31. A. P. Suryavanshi, M.-F. Yu, *Nanotechnology* 18, 105305 (2007).
32. J. Hu, M.-F. Yu, *Science* 329, 313 (2010).
33. O. Stukalov, C. A. Murray, A. Jacina, J. R. Dutcher, *Rev. Sci. Instrum.* 77, 033704 (2006).

34. A. E. Pelling, S. Sehati, E. B. Gralla, J. S. Valentine, J. K. Gimzewski, *Science* 305, 1147 (2004).

35. G. Popescu et al., *Phys. Rev. Lett.* 97, 218101 (2006).

Mechanical Damping in Tapping Mode AFM Operation in Water

The dynamics of the AFM cantilever in air follows that of a linear oscillator[1], $m_c\ddot{x}+(m_c\omega/Q)\dot{x}+kx=F_{ext}$, with the sensitivity of the AFM probe being governed by the quality factor, $Q=m_c\omega/c_a$, in which $\omega=\sqrt{k/m_c}$, $m_c$ is the mass, $\omega$ is the resonance frequency, k is the force constant, and $c_a$ is the damping coefficient of the cantilever system in air and $F_{ext}$ is the excitation force.

For an AFM cantilever immersed in liquid, there is an effective added mass ($m_a$) due to the dragged liquid by an oscillating cantilever. The Q-factor of a cantilever inside liquid, $Q_L$, is then described by $$Q_L = \frac{m_c + m_a}{c_c + c_L}\omega_L \text{ (2, 3)},$$

in which $c_L$ is the damping coefficient due to the hydrodynamic interaction, $c_c$ is the internal damping of the cantilever (in vacuum) and can often be ignored, and $\omega_L$ is the resonance frequency of the cantilever in liquid according to $\omega_L = \sqrt{k/(m_c+m_a)}$ (which is significantly downshifted in liquid compared to the resonance frequency in air). The effective added mass and the hydrodynamic damping coefficient are described by $$m_a = \rho\frac{\pi}{4}W^2L\Gamma'$$

and $$c_L = \rho\frac{\pi}{4}W^2L\omega_L\Gamma'',$$

where $\rho$ is the density of the liquid, W and L are the width and length of the cantilever and $\Gamma'$ and $\Gamma''$ are the hydrodynamic functions[2,3]. For a typical commercial Si AFM probe (~300 μm in length, ~35 μm in width and ~2 μm in thickness, k ~6 N/m and a Q-factor of ~450 in air), the mass $m_c$ of the probe is ~$2\times10^{-12}$ g, the added mass $m_a$ in its dynamic oscillation in water is ~$1.7\times10^{-10}$ g, and the damping coefficient $c_L$ due to the hydrodynamic interaction is ~$8\times10^{-6}$ Ns/m.

For the nanoneedle cantilever system operated in the "trolling mode" in water, the contributions to its damping originate mainly from the Stokes drag force on the portion of the nanoneedle immersed in the liquid ($c_d$) and the nanoscale meniscus formed at the nanoneedle/liquid interface due to the large velocity gradient across the thin meniscus layer ($c_m$). The Q-factor of the nanoneedle cantilever system, $Q_n$, can therefore be expressed as:

$$Q_n = \left(\frac{m_c + m_{na}}{c_m + c_d + c_c}\right)\omega_n, \quad (1)$$

where $m_{na}$ is the added mass onto the nanoneedle during the dynamic operation, which is negligible when compared to the overall mass of the cantilever, and $\omega_n$ is the resonance frequency of the nanoneedle cantilever operated in the "trolling mode", which, due to the negligible added mass, hardly changes from that in air. The Stokes drag coefficient on a nanoneedle moving along its long axis in liquid is $$c_d \approx \frac{2\pi\eta L}{\ln(L/r)-0.72} \quad (4),$$

where η is the dynamic viscosity of the liquid, L and r are the length and the radius of the nanoneedle, respectively. The damping coefficient due to the nanoscale meniscus is $$c_m \approx \frac{2\pi r\eta\ln(\delta/a)}{\theta_d} \text{ (5, 6)},$$

where $\theta_d$ is the dynamic contact angle between the liquid and the nanoneedle, δ is the evanescent decay length $$\left(\delta = \sqrt{\frac{2\eta}{\omega_n\rho}}\right),$$

and a is the liquid molecule size (for water, ~0.278 nm). The Stokes drag $c_d$ is calculated to be ~$25\times10^{-9}$ Ns/m for a needle having an immersed length of 10 μm and a diameter of 600 nm. The damping coefficient $c_m$ due to the nanoscale meniscus is ~$23\times10^{-9}$ Ns/m for the same needle assuming a dynamic contact angle of $\theta_d=\pi/4$ between water and the nanoneedle. The total damping is then ~$5\times10^{-8}$ Ns/m, almost two orders of magnitude smaller than that in the traditional tapping mode operation.

Cell culture and preparation of collagen fibrils: For imaging cell membrane, HeLa cells are cultured in Dulbecco's modified Eagle's medium (DMEM) supplemented with 10% fetal bovine serum (FBS), 100 U/ml penicillin and 100 μg/ml streptomycin at 37° C. under 5% $CO_2$. Concave glass is placed in a petri dish and the cells are cultured on the glass. Cells are imaged 1-4 days after the culture. Prior to the experiment, the cells are washed several times with PBS buffer to remove the dead cells from the surface. The concave culture glass is removed from the petri dish and several drops of PBS buffer are placed on the glass to image the cells in physiological conditions.

Type I collagen fibrils prepared from bovine Achilles tendon (Sigma-Aldrich) are used in this study (8). About 10 mg of the extract is mixed with ~20 mL of 0.01 M sulfuric acid and stored overnight in a refrigerator at below 4° C. The dispersion is shredded by a blender for ~10 min at 4° C. to produce individual collagen fibrils. Different concentrations are made by adding phosphate buffered saline (PBS).

REFERENCES

1. R. Garcia, R. Perez, *Surface Science Reports* 47, 197 (2002).
2. A. Maali et al., *J. Appl. Phys.* 97, 074907 (2005).
3. J. E. Sader, *J. Appl. Phys.* 84, 64 (1998).
4. V. Bloomfield, W. O. Dalton, K. E. Van Holde, *Biopolymers* 5, 135 (1967).
5. C. Jai, J. P. Aime, D. Mariolle, R. Boisgard, F. Bertin, *Nano Lett* 6, 2554 (November, 2006).
6. P.-G. de Gennes, F. Brochard-Wyart, *Capillary and wetting phenomena* (Springer-Verlag, 2004).

7. P. Fratzl, in *Collagen, Structure and Mechanics*. (Springer, New York, 2008).
8. M. Minary-Jolandan, M.-F. Yu, *Biomacromolecules* 10, 2565 (2009).

STATEMENTS REGARDING INCORPORATION BY REFERENCE AND VARIATIONS

All references throughout this application, for example patent documents including issued or granted patents or equivalents; patent application publications; and non-patent literature documents or other source material, including US Pub. No. 2009-0000364, U.S. App. Nos. 61/314,501; 61/352,590; Ser. No. 12/677,429, and corresponding PCT Pub. No. 2009/036295), PCT App. No. PCT/US10/52810; are hereby incorporated by reference herein in their entireties, as though individually incorporated by reference, to the extent each reference is at least partially not inconsistent with the disclosure in this application (for example, a reference that is partially inconsistent is incorporated by reference except for the partially inconsistent portion of the reference).

The terms and expressions which have been employed herein are used as terms of description and not of limitation, and there is no intention in the use of such terms and expressions of excluding any equivalents of the features shown and described or portions thereof, but it is recognized that various modifications are possible within the scope of the invention claimed. Thus, it should be understood that although the present invention has been specifically disclosed by preferred embodiments, exemplary embodiments and optional features, modification and variation of the concepts herein disclosed may be resorted to by those skilled in the art, and that such modifications and variations are considered to be within the scope of this invention as defined by the appended claims. The specific embodiments provided herein are examples of useful embodiments of the present invention and it will be apparent to one skilled in the art that the present invention may be carried out using a large number of variations of the devices, device components, methods steps set forth in the present description. As will be obvious to one of skill in the art, methods and devices useful for the present methods can include a large number of optional composition and processing elements and steps.

When a group of substituents is disclosed herein, it is understood that all individual members of that group and all subgroups, including any isomers, enantiomers, and diastereomers of the group members, are disclosed separately. When a Markush group or other grouping is used herein, all individual members of the group and all combinations and subcombinations possible of the group are intended to be individually included in the disclosure.

Every formulation or combination of components described or exemplified herein can be used to practice the invention, unless otherwise stated.

Whenever a range is given in the specification, for example a size range, frequency range, aspect ratio range, force range, a temperature range, a time range, or a composition or concentration range, all intermediate ranges and subranges, as well as all individual values included in the ranges given are intended to be included in the disclosure. It will be understood that any subranges or individual values in a range or subrange that are included in the description herein can be excluded from the claims herein.

All patents and publications mentioned in the specification are indicative of the levels of skill of those skilled in the art to which the invention pertains. References cited herein are incorporated by reference herein in their entirety to indicate the state of the art as of their publication or filing date and it is intended that this information can be employed herein, if needed, to exclude specific embodiments that are in the prior art. For example, when composition of matter are claimed, it should be understood that compounds known and available in the art prior to Applicant's invention, including compounds for which an enabling disclosure is provided in the references cited herein, are not intended to be included in the composition of matter claims herein.

As used herein, "comprising" is synonymous with "including," "containing," or "characterized by," and is inclusive or open-ended and does not exclude additional, unrecited elements or method steps. As used herein, "consisting of" excludes any element, step, or ingredient not specified in the claim element. As used herein, "consisting essentially of" does not exclude materials or steps that do not materially affect the basic and novel characteristics of the claim. In each instance herein any of the terms "comprising", "consisting essentially of" and "consisting of" may be replaced with either of the other two terms. The invention illustratively described herein suitably may be practiced in the absence of any element or elements, limitation or limitations which is not specifically disclosed herein.

One of ordinary skill in the art will appreciate that starting materials, biological materials, reagents, synthetic methods, purification methods, analytical methods, assay methods, and biological methods other than those specifically exemplified can be employed in the practice of the invention without resort to undue experimentation. All art-known functional equivalents, of any such materials and methods are intended to be included in this invention. The terms and expressions which have been employed are used as terms of description and not of limitation, and there is no intention that in the use of such terms and expressions of excluding any equivalents of the features shown and described or portions thereof, but it is recognized that various modifications are possible within the scope of the invention claimed. Thus, it should be understood that although the present invention has been specifically disclosed by preferred embodiments and optional features, modification and variation of the concepts herein disclosed may be resorted to by those skilled in the art, and that such modifications and variations are considered to be within the scope of this invention as defined by the appended claims.

We claim:

1. A method of imaging a material submersed in liquid by tapping mode atomic force microscopy, said method comprising the steps of:
  providing the material submersed in liquid, wherein said material has a submersion depth in said liquid;
  providing a microfabricated atomic force microscope probe comprising:
    a cantilever beam having a distal end;
    a nanoneedle probe having a first end connected to the distal end of the cantilever beam and a second end ending in a tip, wherein the nanoneedle probe has a longitudinally-extending axis extending between said first end and said second end that is substantially perpendicular to a surface of the cantilever beam distal end;
  immersing a portion of said nanoneedle in said liquid, wherein said nanoneedle immersed portion is sufficient for the tip end to contact the material submersed in liquid and the cantilever beam remains outside said liquid; and
  oscillating said cantilever beam at an oscillating frequency, wherein the nanoneedle probe tip taps said material during said oscillation, thereby imaging said material in liquid.

2. The method of claim 1, wherein said submersion depth is selected from a range that is greater than or equal to 1 μm and less than or equal to 200 μm.

3. The method of claim 1, wherein said nanoneedle has a diameter that is substantially uniform in a middle portion between said nanoneedle probe first end and second end.

4. The method of claim 1, wherein said nanoneedle has a length selected from a range that is greater than or equal to 20 μm and less than or equal to 500 μm.

5. The method of claim 4, wherein said nanoneedle has an aspect ratio defined by the ratio of nanoneedle length to nanoneedle characteristic width or diameter, wherein the aspect ratio is selected from a range that is greater than or equal to 20 and less than or equal to 500.

6. The method of claim 1, wherein said nanoneedle in said liquid has a nanoneedle immersion length, said nanoneedle immersion length selected from a range that is greater than or equal to 1 μm and less than or equal to 200 μm.

7. The method of claim 1, wherein said nanoneedle tip end is tapered and has a curved end surface with a radius of curvature that is less than or equal to 100 nm.

8. The method of claim 1, wherein said oscillating frequency is selected from a range that is greater than or equal to 1 kHz.

9. The method of claim 1, wherein the oscillating nanoneedle has a hydrodynamic interaction cross sectional area in liquid that is less than or equal to 10 μm$^2$.

10. The method of claim 1, wherein the atomic force microscope probe has an intrinsic Q-factor that is greater than or equal to 10 when said nanoneedle portion is immersed and oscillating in said liquid.

11. The method of claim 1, wherein the probe tip tapping on the material generates an average contact force between the nanoneedle tip end and the material surface that is less than or equal to 1 nN.

12. The method of claim 1, wherein the nanoneedle has a length and the nanoneedle immersed portion is less than or equal to 80% the nanoneedle length.

13. The method of claim 12, wherein the immersion depth is less than or equal to 60 μm.

14. The method of claim 1 wherein said nanoneedle has a nanoneedle length, said method further comprising the steps of:
   supporting said material on a curved substrate
   covering the material in the liquid, wherein the curved substrate provides a spatially-varying liquid immersion depth; and
   imaging the material at a location wherein the liquid immersion depth is less than or equal to the nanoneedle length.

15. The method of claim 14, wherein the curved substrate is concave-shaped and part of a container having an outer edge for holding liquid, and said imaging is performed in a liquid-covered region adjacent to the container outer edge.

16. The method of claim 1, wherein the material comprises a soft material having a Young's modulus that is less than or equal to 100 MPa.

17. The method of claim 16, wherein the material is a biological organism.

18. The method of claim 17, wherein the biological organism is a living mammalian cell.

19. The method of claim 18, further comprising imaging a microscale or a nanoscale feature on a surface of the biological organism.

20. The method of claim 1, wherein the tip tapping of the material is at an average force that is at least 10-fold smaller than a corresponding tapping force for an equivalent atomic microscope probe without the nanoneedle portion and with the cantilever beam submersed in the liquid.

21. The method of claim 1, wherein the material is selected from the group consisting of: soft tissue, biological cell, biomolecule, nanowire, nanotube, planar material, chemically functionalized surface, biologically functionalized surface, polymer surface, gel surface, self-assembled monolayer, synthetic lipid membrane, tissue engineered scaffold, membrane filter, flexible electronic device, MEMS device, biosensor, and chemical sensor.

22. The method of claim 1, wherein the atomic force microscope is used to measure an interaction force arising from a change on a material surface corresponding to: chemical composition; biological composition; surface composition; mechanical stiffness variation; mechanical viscoelastic property variation, surface adhesion variation, electrical charge distribution, or magnetic property variation.

23. The method of claim 1, wherein the nanoneedle is surface functionalized to provide strong physical interaction with a chemical or biological substance, the method further comprising identifying the chemical or biological substance by tapping said functionalized nanoneedle against the material.

24. The method of claim 1, wherein a portion of the nanoneedle is coated with an electrically insulating thin film, wherein at least a portion of said nanoneedle tip is not coated, the method further comprising the step of:
   measuring local electrical conductivity or electrochemical activity on a surface of the material.

25. The method of claim 1, wherein the nanoneedle is a metallic nanowire deposited onto said cantilever beam by a meniscus-confined electrodeposition method.

26. The method of claim 1, wherein the liquid has a liquid surface and the immersing step further comprises inserting said nanoneedle probe to said liquid at an insertion angle, wherein said insertion angle is substantially perpendicular to said liquid surface.

27. The method of claim 1, further comprising retrofitting a conventional AFM probe with the nanoneedle probe, wherein the retrofitting is by meniscus-confined electrodeposition on a distal end of a cantilever.

28. A high resolution atomic force microscope system for imaging materials immersed in a liquid, said system comprising an atomic force microscope having:
   an atomic force microscope probe having a cantilever beam with a distal end;
   a nanoneedle probe having a first end bonded to the cantilever beam distal end and a second end that is a tapered probe tip, wherein the nanoneedle probe has a longitudinally-extending axis extending between said first end and said second end that is substantially perpendicular to a surface of the cantilever beam distal end; and
   a container for holding a material submersed in a liquid, wherein the container has a bottom surface shaped to provide a spatially varying submersion depth, wherein a portion of the material is submersed in liquid having a submersion depth that is less than the distance between the nanoneedle first and second ends, so that said cantilever beam is outside the liquid during material imaging.

29. The system of claim 28, wherein the bottom surface shape is curved or comprises microchannels having a depth that is less than or equal to the distance between the nanoneedle first and second ends.

* * * * *